US012750714B2

(12) United States Patent
Hindy et al.

(10) Patent No.: US 12,750,714 B2
(45) Date of Patent: Sep. 29, 2026

(54) TRANSMITTING A CHANNEL STATE INFORMATION REPORT

(71) Applicant: Lenovo (Singapore) Pte. Ltd., New Tech Park (SG)

(72) Inventors: Ahmed Hindy, Aurora, IL (US); Vijay Nangia, Woodridge, IL (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 299 days.

(21) Appl. No.: 18/573,771

(22) PCT Filed: Jun. 1, 2022

(86) PCT No.: PCT/IB2022/055099
§ 371 (c)(1),
(2) Date: Dec. 22, 2023

(87) PCT Pub. No.: WO2022/269390
PCT Pub. Date: Dec. 29, 2022

(65) Prior Publication Data
US 2024/0306025 A1 Sep. 12, 2024

Related U.S. Application Data

(60) Provisional application No. 63/215,347, filed on Jun. 25, 2021.

(51) Int. Cl.
*H04W 4/00* (2018.01)
*H04B 7/06* (2006.01)
(Continued)

(52) U.S. Cl.
CPC .......... *H04W 24/10* (2013.01); *H04B 7/0626* (2013.01); *H04L 5/0048* (2013.01)

(58) Field of Classification Search
None
See application file for complete search history.

(56) References Cited

U.S. PATENT DOCUMENTS

2019/0053089 A1* 2/2019 Kwak ............... H04W 72/1273
2019/0379506 A1 12/2019 Cheng
2022/0069959 A1* 3/2022 Zarifi ...................... H04L 5/001

FOREIGN PATENT DOCUMENTS

WO 2020056708 A1 3/2020
WO WO-2022205068 A1 * 10/2022 .......... H04W 72/542

OTHER PUBLICATIONS

PCT/IB2022/055099, "Notification of Transmittal of the International Search Report and the Written Opinion of the International Searching Authority, or the Declaration", International Searching Authority, Aug. 26, 2022, pp. 1-14.

(Continued)

*Primary Examiner* — Zewdu A Beyen
(74) *Attorney, Agent, or Firm* — Kunzler Needham Hilton; Bruce R. Needham

(57) ABSTRACT

Apparatuses, methods, and systems are disclosed for transmitting a channel state information report. One method includes receiving, at a UE, a CSI reporting setting including one or more CSI-RS resource settings. The method includes receiving, from a plurality of transmission points, one or more CMRs including a set of NZP CSI-RS resources based on the received one or more CSI-RS resource settings. The method includes determining, based on the received CSI reporting setting, a first CMR group including CMR units from a first subset of the one or more CMRs and a second CMR group including CMR units from a second subset of the one or more CMRs. The method includes determining a first beam set associated with the first CMR group and a
(Continued)

second beam set associated with the second CMR group based on the received CSI reporting setting.

20 Claims, 11 Drawing Sheets

(51) Int. Cl.
*H04L 5/00* (2006.01)
*H04W 24/10* (2009.01)

(56) References Cited

OTHER PUBLICATIONS

3GPP, "RAN1 Chairman's Notes", 3GPP TSG RAN WG1 Meeting #103-e, Oct. 26-Nov. 13, 2020, pp. 1-108.

Samsung et al., "WF on Type I and II CSI codebooks", 3GPP TSG-RAN WG1 #89 R1-1709232, May 15-19, 2017, pp. 1-24.

ZTE, "CSI enhancements for Multi-TRP and FR1 FDD reciprocity", 3GPP TSG RAN WG1 #104-e R1-2100291, Jan. 25-Feb. 5, 2021, pp. 1-15.

3GPP, "3rd Generation Partnership Project; Technical Specification Group Radio Access Network; NR; Multiplexing and channel coding (Release 16)", 3GPP TS 38.212 V16.5.0, Mar. 2021, pp. 1-152.

3GPP, "3rd Generation Partnership Project; Technical Specification Group Radio Access Network; NR; Physical layer procedures for data (Release 16)", 3GPP TS 38.214 V16.5.0, Mar. 2021, pp. 1-171.

3GPP, "3rd Generation Partnership Project; Technical Specification Group Radio Access Network; NR; Radio Resource Control (RRC) protocol specification (Release 16)", 3GPP TS 38.331 V16.4.0, Mar. 2021, pp. 1-949.

* cited by examiner

400

```
-- ASN1START
-- TAG-CSI-REPORTCONFIG-START

CSI-ReportConfig ::=            SEQUENCE {
   reportConfigId                  CSI-ReportConfigId,
   carrier                        ServCellIndex          OPTIONAL,   -- Need S
   resourcesForChannelMeasurement       CSI-ResourceConfigId,
   csi-IM-ResourcesForInterference      CSI-ResourceConfigId      OPTIONAL,   -- Need R
   nzp-CSI-RS-ResourcesForInterference     CSI-ResourceConfigId      OPTIONAL,   -- Need R


   reportConfigType                 CHOICE {
      periodic                     SEQUENCE {
         reportSlotConfig              CSI-ReportPeriodicityAndOffset,
         pucch-CSI-ResourceList          SEQUENCE (SIZE (1..maxNrofBWPs)) OF PUCCH-CSI-
Resource
      },
      semiPersistentOnPUCCH             SEQUENCE {
         reportSlotConfig              CSI-ReportPeriodicityAndOffset,
         pucch-CSI-ResourceList          SEQUENCE (SIZE (1..maxNrofBWPs)) OF PUCCH-CSI-
Resource
      },
      semiPersistentOnPUSCH             SEQUENCE {
         reportSlotConfig             ENUMERATED {sl5, sl10, sl20, sl40, sl80, sl160, sl320},
         reportSlotOffsetList          SEQUENCE (SIZE (1.. maxNrofUL-Allocations)) OF
INTEGER(0..32),
         p0alpha                      P0-PUSCH-AlphaSetId
      },
      aperiodic                    SEQUENCE {
         reportSlotOffsetList          SEQUENCE (SIZE (1..maxNrofUL-Allocations)) OF
INTEGER(0..32)
      }
   },
    mPanel-Codebook-Enabled                ENUMERATED (TRUE)         OPTIONAL,  -- Need R

                              [...................................]

-- TAG-CSI-REPORTCONFIG-STOP
-- ASN1STOP
```

FIG. 4

500

```
-- ASN1START
-- TAG-CSI-REPORTCONFIG-START

CSI-ReportConfig ::=            SEQUENCE {
  reportConfigId                  CSI-ReportConfigId,
  carrier                       ServCellIndex          OPTIONAL,   -- Need S
  resourcesForChannelMeasurement        CSI-ResourceConfigId,
  csi-IM-ResourcesForInterference       CSI-ResourceConfigId       OPTIONAL,   -- Need R
  nzp-CSI-RS-ResourcesForInterference     CSI-ResourceConfigId       OPTIONAL,   -- Need R


  reportConfigType                CHOICE {
    periodic                    SEQUENCE {
      reportSlotConfig              CSI-ReportPeriodicityAndOffset,
      pucch-CSI-ResourceList          SEQUENCE (SIZE (1..maxNrofBWPs)) OF PUCCH-CSI-
Resource
    },
    semiPersistentOnPUCCH             SEQUENCE {
      reportSlotConfig              CSI-ReportPeriodicityAndOffset,
      pucch-CSI-ResourceList          SEQUENCE (SIZE (1..maxNrofBWPs)) OF PUCCH-CSI-
Resource
    },
    semiPersistentOnPUSCH            SEQUENCE {
      reportSlotConfig             ENUMERATED {sl5, sl10, sl20, sl40, sl80, sl160, sl320},
      reportSlotOffsetList          SEQUENCE (SIZE (1.. maxNrofUL-Allocations)) OF
INTEGER(0..32),
      p0alpha                      P0-PUSCH-AlphaSetId
    },
    aperiodic                   SEQUENCE {
      reportSlotOffsetList          SEQUENCE (SIZE (1..maxNrofUL-Allocations)) OF
INTEGER(0..32)
    }
  },
   nPMI                             ENUMERATED {1,2,3,4}   OPTIONAL,  -- Need R

                                 [....................................]

-- TAG-CSI-REPORTCONFIG-STOP
-- ASN1STOP
```

FIG. 5

600

```
-- ASN1START
-- TAG-CODEBOOKCONFIG-START

CodebookConfig ::=                    SEQUENCE {
   codebookType                        CHOICE {

                                  [...................................]
   }
     nPMI                         ENUMERATED {1,2}          OPTIONAL,      -- Need R
}

CodebookConfig-r18  ::=           SEQUENCE  {
   codebookType                        CHOICE {

                                  [...................................]
   }
     nPMI                         ENUMERATED {1,2}          OPTIONAL,      -- Need R
}

-- TAG-CODEBOOKCONFIG-STOP
-- ASN1STOP
```

FIG. 6

700

```
-- ASN1START
-- TAG-CSI-REPORTCONFIG-START

CSI-ReportConfig ::=            SEQUENCE {
  reportConfigId                  CSI-ReportConfigId,
  carrier                       ServCellIndex          OPTIONAL,   -- Need S
  resourcesForChannelMeasurement        CSI-ResourceConfigId,
  csi-IM-ResourcesForInterference      CSI-ResourceConfigId     OPTIONAL,   -- Need R
  nzp-CSI-RS-ResourcesForInterference    CSI-ResourceConfigId     OPTIONAL,   -- Need R

                      [..................................]

  timeRestrictionForChannelMeasurements     ENUMERATED {configured, notConfigured},
  timeRestrictionForInterferenceMeasurements  ENUMERATED {configured, notConfigured},
  codebookConfig                  CodebookConfig            OPTIONAL,   -- Need R
  codebookConfig2                  CodebookConfig            OPTIONAL,   -- Need R
    dummy                     ENUMERATED {n1, n2}         OPTIONAL,   -- Need R

                      [..................................]

  reportQuantity-r16              CHOICE {
    cri-SINR-r16                  NULL,
    ssb-Index-SINR-r16                NULL
  }                                   OPTIONAL,   -- Need R
  codebookConfig-r16               CodebookConfig-r16          OPTIONAL    -- Need R
    codebookConfig2-r18               CodebookConfig-r18          OPTIONAL    -- Need R
  ]]
}

                      [..................................]

-- TAG-CSI-REPORTCONFIG-STOP
-- ASN1STOP
```

FIG. 7

800

```
-- ASN1START
-- TAG-CSI-REPORTCONFIG-START

CSI-ReportConfig ::=            SEQUENCE {
  reportConfigId                  CSI-ReportConfigId,
  carrier                       ServCellIndex          OPTIONAL,   -- Need S
  resourcesForChannelMeasurement        CSI-ResourceConfigId,
  csi-IM-ResourcesForInterference       CSI-ResourceConfigId       OPTIONAL,   -- Need R
  nzp-CSI-RS-ResourcesForInterference     CSI-ResourceConfigId       OPTIONAL,   -- Need R

                                   [...................................]
  reportQuantity                  CHOICE {
    none                        NULL,
    cri-RI-PMI-CQI                   NULL,
    cri-RI-i1                     NULL,
    cri-RI-i1-CQI                   SEQUENCE {
      pdsch-BundleSizeForCSI             ENUMERATED {n2, n4}       OPTIONAL    -- Need S
    },
    cri-RI-CQI                     NULL,
    cri-RSRP                      NULL,
    ssb-Index-RSRP                   NULL,
    cri-RI-LI-PMI-CQI                 NULL
  },
  reportQuantity1                  CHOICE {
    none                        NULL,
    cri-RI-PMI-CQI                   NULL,
    cri-RI-i1                     NULL,
    cri-RI-i1-CQI                   SEQUENCE {
      pdsch-BundleSizeForCSI             ENUMERATED {n2, n4}       OPTIONAL    -- Need S
    },
    cri-RI-CQI                     NULL,
    cri-RSRP                      NULL,
    ssb-Index-RSRP                   NULL,
    cri-RI-LI-PMI-CQI                 NULL
  },                                                  OPTIONAL,   -- Need R
}
                                   [...................................]
-- TAG-CSI-REPORTCONFIG-STOP
-- ASN1STOP
```

FIG. 8

900

```
-- ASN1START
-- TAG-CSI-REPORTCONFIG-START

CSI-ReportConfig ::=            SEQUENCE {
   reportConfigId                  CSI-ReportConfigId,
   carrier                         ServCellIndex          OPTIONAL,   -- Need S
   resourcesForChannelMeasurement      CSI-ResourceConfigId,
   csi-IM-ResourcesForInterference     CSI-ResourceConfigId     OPTIONAL,   -- Need R
   nzp-CSI-RS-ResourcesForInterference    CSI-ResourceConfigId     OPTIONAL,   -- Need R


   reportConfigType                CHOICE {
      periodic                     SEQUENCE {
         reportSlotConfig             CSI-ReportPeriodicityAndOffset,
         pucch-CSI-ResourceList          SEQUENCE (SIZE (1..maxNrofBWPs)) OF PUCCH-CSI-
Resource
      },
      semiPersistentOnPUCCH             SEQUENCE {
         reportSlotConfig             CSI-ReportPeriodicityAndOffset,
         pucch-CSI-ResourceList          SEQUENCE (SIZE (1..maxNrofBWPs)) OF PUCCH-CSI-
Resource
      },
      semiPersistentOnPUSCH             SEQUENCE {
         reportSlotConfig             ENUMERATED {sl5, sl10, sl20, sl40, sl80, sl160, sl320},
         reportSlotOffsetList          SEQUENCE (SIZE (1.. maxNrofUL-Allocations)) OF
INTEGER(0..32),
         p0alpha                      P0-PUSCH-AlphaSetId
      },
      aperiodic                    SEQUENCE {
         reportSlotOffsetList          SEQUENCE (SIZE (1..maxNrofUL-Allocations)) OF
INTEGER(0..32)
      }
   },
    Nzp-CSI-RS-ResourceGroup            ENUMERATED {1,2,3,4}   OPTIONAL,  -- Need R

                          [....................................]

-- TAG-CSI-REPORTCONFIG-STOP
-- ASN1STOP
```

FIG. 9

TRANSMITTING A CHANNEL STATE INFORMATION REPORT

CROSS-REFERENCE TO RELATED APPLICATIONS

This application claims priority to U.S. Patent Application Ser. No. 63/215,347 entitled "APPARATUSES, METHODS, AND SYSTEMS FOR CSI ENHANCEMENTS FOR DISTRIBUTED MIMO" and filed on Jun. 25, 2021 for Ahmed Hindy et al., which is incorporated herein by reference in its entirety.

FIELD

The subject matter disclosed herein relates generally to wireless communications and more particularly relates to transmitting a channel state information report.

BACKGROUND

In certain wireless communications networks, there may be multiple panels in a cluster connected to a central unit. In such networks, there may be reporting for the multiple panels.

BRIEF SUMMARY

Methods for transmitting a channel state information report are disclosed. Apparatuses and systems also perform the functions of the methods. One embodiment of a method includes receiving, at a UE, a CSI reporting setting including one or more CSI-RS resource settings. In some embodiments, the method includes receiving, from a plurality of transmission points, one or more CMRs including a set of NZP CSI-RS resources based on the received one or more CSI-RS resource settings. In certain embodiments, the method includes determining, based on the received CSI reporting setting, a first CMR group including CMR units from a first subset of the one or more CMRs and a second CMR group including CMR units from a second subset of the one or more CMRs. In various embodiments, the method includes determining a first beam set associated with the first CMR group and a second beam set associated with the second CMR group based on the received CSI reporting setting. In some embodiments, the method includes transmitting a CSI report. The CSI report includes values of a subset of a set of indicator types including a CRI, a RI, a PMI, a LI, a CQI, or a combination thereof: one or more indicators in each subset of the set of indicator types are included in the CSI report and based on the first CMR group, the second CMR group, the first beam set, the second beam set, or some combination thereof; and the values of the subset of indicator types correspond to a subset of a set of one or more transmission hypotheses.

One apparatus for transmitting a channel state information report includes a receiver to: receive a CSI reporting setting including one or more CSI-RS resource settings; and receive, from a plurality of transmission points, one or more CMRs including a set of NZP CSI-RS resources based on the received one or more CSI-RS resource settings. In various embodiments, the apparatus includes a processor to: determine, based on the received CSI reporting setting, a first CMR group including CMR units from a first subset of the one or more CMRs and a second CMR group including CMR units from a second subset of the one or more CMRs; and determine a first beam set associated with the first CMR group and a second beam set associated with the second CMR group based on the received CSI reporting setting. In some embodiments, the apparatus includes a transmitter to transmit a CSI report. The CSI report includes values of a subset of a set of indicator types including a CRI, a RI, a PMI, a LI, a CQI, or a combination thereof: one or more indicators in each subset of the set of indicator types are included in the CSI report and based on the first CMR group, the second CMR group, the first beam set, the second beam set, or some combination thereof; and the values of the subset of indicator types correspond to a subset of a set of one or more transmission hypotheses.

Another embodiment of a method for transmitting a channel state information report includes transmitting, from a plurality of transmission points, a CSI reporting setting including one or more CSI-RS resource settings. In some embodiments, the method includes transmitting one or more CMRs including a set of NZP CSI-RS resources based on the received one or more CSI-RS resource settings. Based on the received CSI reporting setting, a first CMR group including CMR units is determined from a first subset of the one or more CMRs and a second CMR group including CMR units from a second subset of the one or more CMRs; and a first beam set associated with the first CMR group and a second beam set associated with the second CMR group is determined based on the received CSI reporting setting. In certain embodiments, the method includes receiving a CSI report. The CSI report includes values of a subset of a set of indicator types including a CRI, a RI, a PMI, a LI, a CQI, or a combination thereof: one or more indicators in each subset of the set of indicator types are included in the CSI report and based on the first CMR group, the second CMR group, the first beam set, the second beam set, or some combination thereof; and the values of the subset of indicator types correspond to a subset of a set of one or more transmission hypotheses.

Another apparatus for transmitting a channel state information report includes a transmitter to: transmit a CSI reporting setting including one or more CSI-RS resource settings; and transmit one or more CMRs including a set of NZP CSI-RS resources based on the received one or more CSI-RS resource settings. Based on the received CSI reporting setting, a first CMR group including CMR units is determined from a first subset of the one or more CMRs and a second CMR group including CMR units from a second subset of the one or more CMRs; and a first beam set associated with the first CMR group and a second beam set associated with the second CMR group is determined based on the received CSI reporting setting. In various embodiments, the apparatus includes a receiver to receive a CSI report. The CSI report includes values of a subset of a set of indicator types including a CRI, a RI, a PMI, a LI, a CQI, or a combination thereof: one or more indicators in each subset of the set of indicator types are included in the CSI report and based on the first CMR group, the second CMR group, the first beam set, the second beam set, or some combination thereof; and the values of the subset of indicator types correspond to a subset of a set of one or more transmission hypotheses.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 4 is a schematic block diagram illustrating one embodiment of ASN.1 code for a CSI-ReportConfig reporting setting IE with a multi-TRP transmission indication according to the first embodiment of the first set of embodiments:

FIG. 5 is a schematic block diagram illustrating one embodiment of ASN.1 code for triggering more than one CSI report within a CSI-ReportConfig reporting setting IE according to the second embodiment of the first set of embodiments:

FIG. 6 is a schematic block diagram illustrating another embodiment of ASN.1 code for triggering two CSI reports within a CodebookConfig codebook configuration IE according to the second embodiment of the first set of embodiments:

FIG. 7 is a schematic block diagram illustrating one embodiment of ASN.1 code for triggering two CSI reports within a CSI-ReportConfig reporting setting IE according to the third embodiment of the first set of embodiments:

FIG. 8 is a schematic block diagram illustrating one embodiment of ASN.1 code for triggering two CSI reports within a CSI-ReportConfig reporting setting IE according to the fourth embodiment of the first set of embodiments:

FIG. 9 is a schematic block diagram illustrating one embodiment of ASN.1 code for indicating the index of an NZP CSI-RS resource corresponding to the selected panel within a CSI-ReportConfig reporting setting IE according to the sixth embodiment of the first set of embodiments:

DETAILED DESCRIPTION

Figure 1:
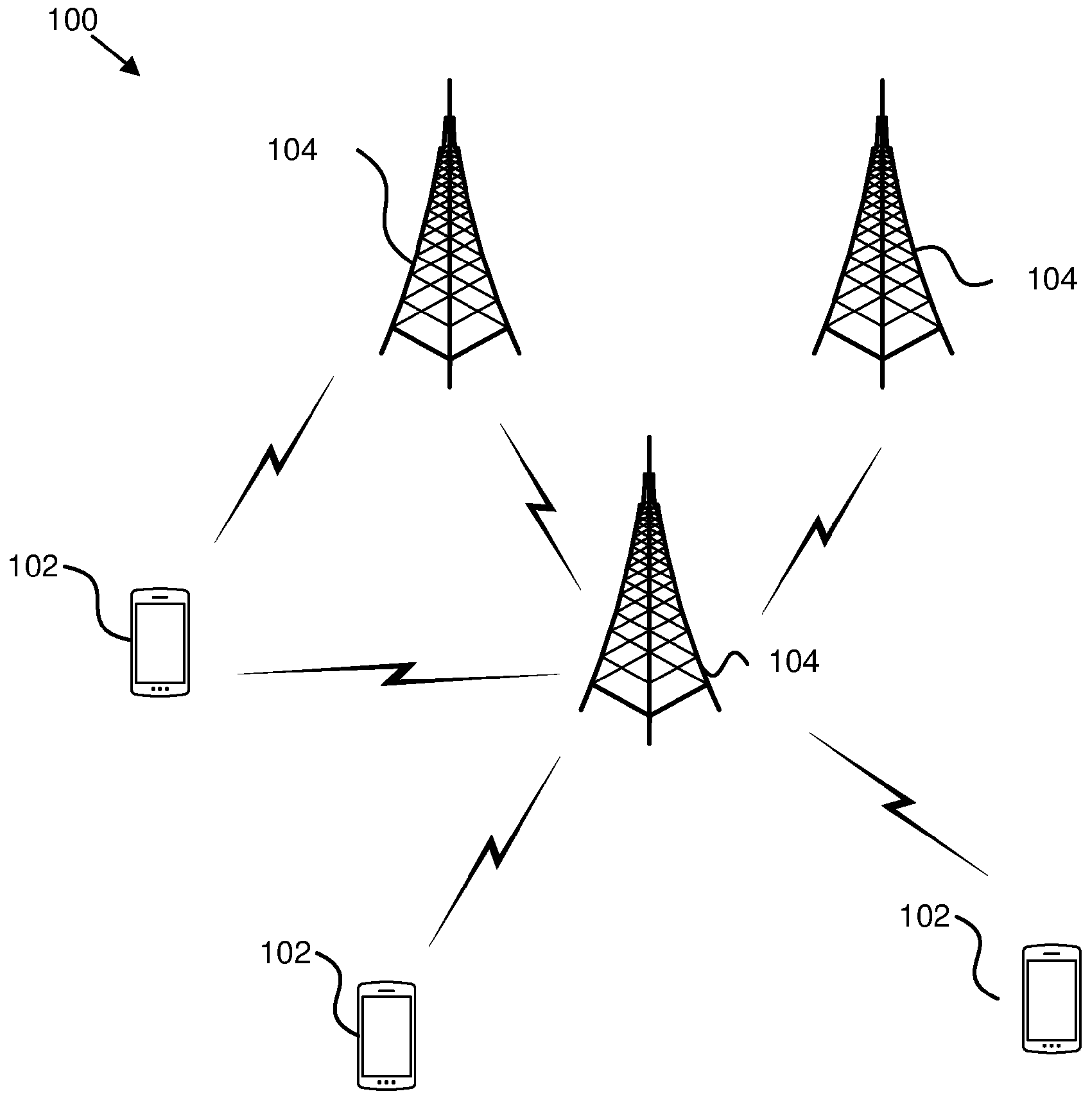
FIG. 1 is a schematic block diagram illustrating one embodiment of a wireless communication system for transmitting a channel state information report.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for transmitting a channel state information report. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. In certain embodiments, the remote units 102 may communicate directly with other remote units 102 via sidelink communication.

The network units 104 may be distributed over a geographic region. In certain embodiments, a network unit 104 may also be referred to and/or may include one or more of an access point, an access terminal, a base, a base station, a location server, a core network ("CN"), a radio network entity, a Node-B, an evolved node-B ("eNB"), a 5G node-B ("gNB"), a Home Node-B, a relay node, a device, a core network, an aerial server, a radio access node, an access point ("AP"), new radio ("NR"), a network entity, an access and mobility management function ("AMF"), a unified data management ("UDM"), a unified data repository ("UDR"), a UDM/UDR, a policy control function ("PCF"), a radio access network ("RAN"), a network slice selection function ("NSSF"), an operations, administration, and management ("OAM"), a session management function ("SMF"), a user plane function ("UPF"), an application function, an authentication server function ("AUSF"), security anchor functionality ("SEAF"), trusted non-3GPP gateway function ("TNGF"), or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in third generation partnership project ("3GPP"), wherein the network unit 104 transmits using an OFDM modulation scheme on the downlink ("DL") and the remote units 102 transmit on the uplink ("UL") using a single-carrier frequency division multiple access ("SC-FDMA") scheme or an orthogonal frequency division multiplexing ("OFDM") scheme. More generally, however, the wireless communication system 100 may implement some other open or proprietary communication protocol, for example, WiMAX, institute of electrical and electronics engineers ("IEEE") 802.11 variants, global system for mobile communications ("GSM"), general packet radio service ("GPRS"), universal mobile telecommunications system ("UMTS"), long term evolution ("LTE") variants, code division multiple access 2000 ("CDMA2000"), Bluetooth R, ZigBee, Sigfox, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a remote unit 102 may receive, at a UE, a CSI reporting setting including one or more CSI-RS resource settings. In some embodiments, the remote unit 102 may receive, from a plurality of transmission points, one or more CMRs including a set of NZP CSI-RS resources based on the received one or more CSI-RS resource settings. In certain embodiments, the remote unit 102 may determine, based on the received CSI reporting setting, a first CMR group including CMR units from a first subset of the one or more CMRs and a second CMR group including CMR units from a second subset of the one or more CMRs. In various embodiments, the remote unit 102 may determine a first beam set associated with the first CMR group and a second beam set associated with the second CMR group based on the received CSI reporting setting. In some embodiments, the remote unit 102 may transmit a CSI report. The CSI report includes values of a subset of a set of indicator types including a CRI, a RI, a PMI, a LI, a CQI, or a combination thereof: one or more indicators in each subset of the set of indicator types are included in the CSI report and based on the first CMR group, the second CMR group, the first beam set, the second beam set, or some combination thereof; and the values of the subset of indicator types correspond to a subset of a set of one or more transmission hypotheses. Accordingly, the remote unit 102 may be used for transmitting a channel state information report.

In certain embodiments, a network unit 104 may transmit, from a plurality of transmission points, a CSI reporting setting including one or more CSI-RS resource settings. In some embodiments, the network unit 104 may transmit one or more CMRs including a set of NZP CSI-RS resources based on the received one or more CSI-RS resource settings. Based on the received CSI reporting setting, a first CMR group including CMR units is determined from a first subset of the one or more CMRs and a second CMR group including CMR units from a second subset of the one or more CMRs; and a first beam set associated with the first CMR group and a second beam set associated with the second CMR group is determined based on the received CSI reporting setting. In certain embodiments, the network unit 104 may receive a CSI report. The CSI report includes values of a subset of a set of indicator types including a CRI, a RI, a PMI, a LI, a CQI, or a combination thereof; one or more indicators in each subset of the set of indicator types are included in the CSI report and based on the first CMR group, the second CMR group, the first beam set, the second beam set, or some combination thereof; and the values of the subset of indicator types correspond to a subset of a set of one or more transmission hypotheses. Accordingly, the network unit 104 may be used for transmitting a channel state information report.

Figure 2:
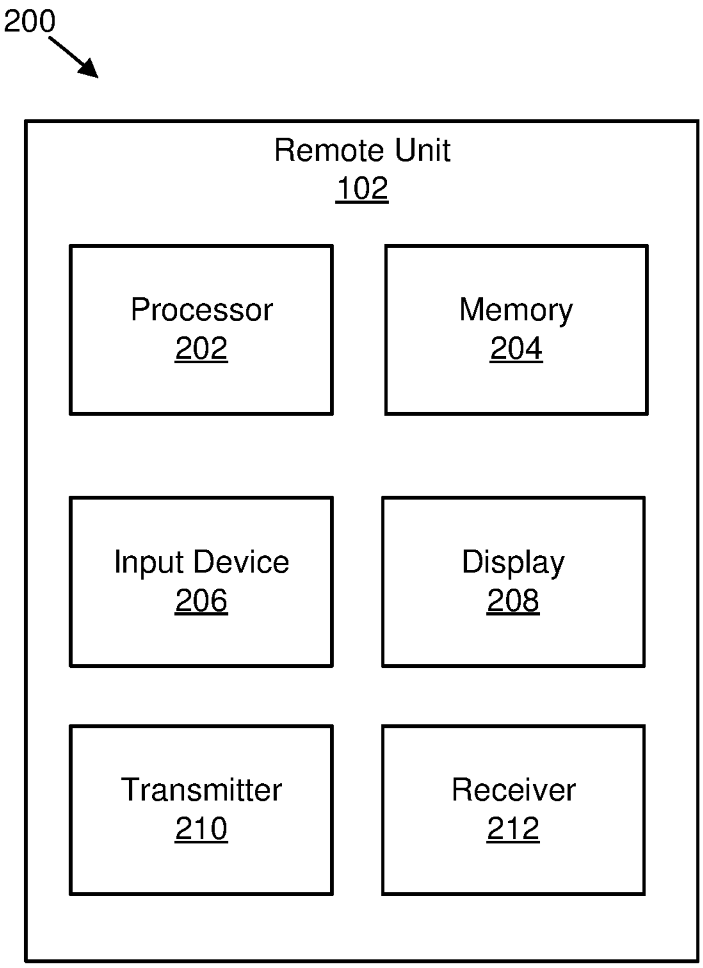
FIG. 2 is a schematic block diagram illustrating one embodiment of an apparatus that may be used for transmitting a channel state information report.

FIG. 2 depicts one embodiment of an apparatus 200 that may be used for transmitting a channel state information report. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, a liquid crystal display ("LCD"), a light emitting diode ("LED") display, an organic light emitting diode ("OLED") display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

In certain embodiments, the receiver 212 may: receive a CSI reporting setting including one or more CSI-RS resource settings; and receive, from a plurality of transmission points, one or more CMRs including a set of NZP CSI-RS resources based on the received one or more CSI-RS resource settings. In various embodiments, the processor 202 may: determine, based on the received CSI reporting setting, a first CMR group including CMR units from a first subset of the one or more CMRs and a second CMR group including CMR units from a second subset of the one or more CMRs; and determine a first beam set associated with the first CMR group and a second beam set associated with the second CMR group based on the received CSI reporting setting. In some embodiments, the transmitter 210 may transmit a CSI report. The CSI report includes values of a subset of a set of indicator types including a CRI, a RI, a PMI, a LI, a CQI, or a combination thereof: one or more indicators in each subset of the set of indicator types are included in the CSI report and based on the first CMR group, the second CMR group, the first beam set, the second beam set, or some combination thereof; and the values of the subset of indicator types correspond to a subset of a set of one or more transmission hypotheses.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
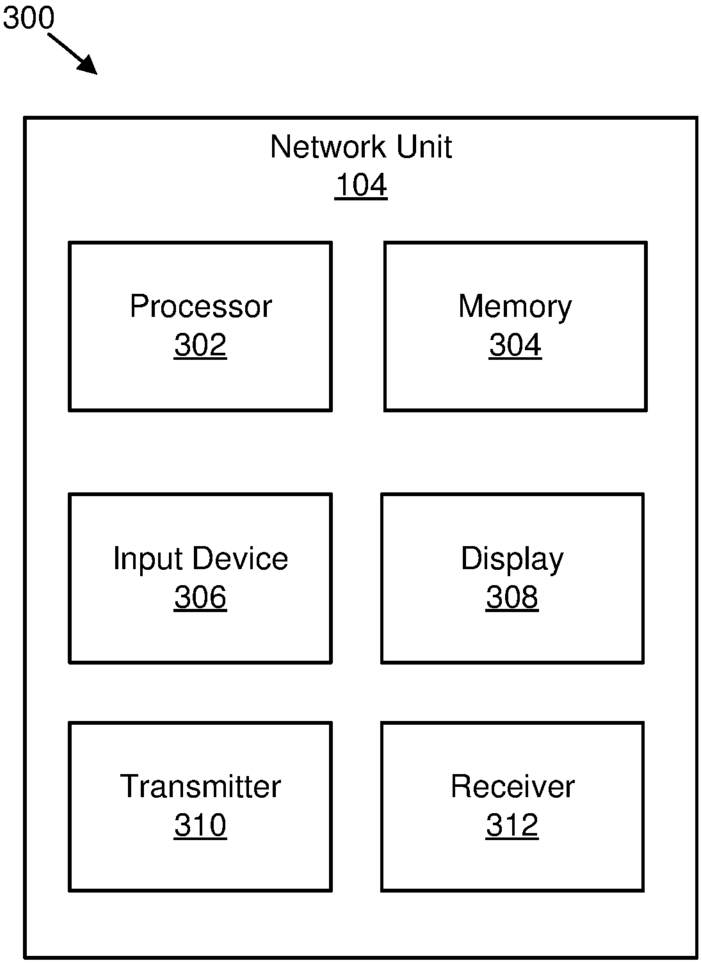
FIG. 3 is a schematic block diagram illustrating one embodiment of an apparatus that may be used for transmitting a channel state information report.

FIG. 3 depicts one embodiment of an apparatus 300 that may be used for transmitting a channel state information report. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In certain embodiments, the transmitter 310 may: transmit a CSI reporting setting including one or more CSI-RS resource settings; and transmit one or more CMRs including a set of NZP CSI-RS resources based on the received one or more CSI-RS resource settings. Based on the received CSI reporting setting, a first CMR group including CMR units is determined from a first subset of the one or more CMRs and a second CMR group including CMR units from a second subset of the one or more CMRs; and a first beam set associated with the first CMR group and a second beam set associated with the second CMR group is determined based on the received CSI reporting setting. In various embodiments, the receiver 312 may receive a CSI report. The CSI report includes values of a subset of a set of indicator types including a CRI, a RI, a PMI, a LI, a CQI, or a combination thereof: one or more indicators in each subset of the set of indicator types are included in the CSI report and based on the first CMR group, the second CMR group, the first beam set, the second beam set, or some combination thereof; and the values of the subset of indicator types correspond to a subset of a set of one or more transmission hypotheses.

It should be noted that one or more embodiments described herein may be combined into a single embodiment.

In certain embodiments, such as for 3GPP new radio ("NR"), multiple panels within a gNB may communicate simultaneously with one UE to enhance coverage, throughput, and/or reliability. This may come at the expense of excessive control signaling between a network side and a user equipment ("UE") side, so as to communicate the best transmission configuration (e.g., whether to support multipoint transmission), and if so, which panel would operate simultaneously, in addition to a possibly super-linear increase in the amount of channel state information ("CSI") feedback reported from the UE to the network, since a distinct report may be needed for each point. In some embodiments, for Type-II codebook with high resolution, a number of precoder matrix indicator ("PMI") bits fed back from the UE in a gNB via uplink control information ("UCI") may be very large (e.g., >1000 bits at large bandwidth), even for a single-point transmission. Thereby, reducing the number of PMI feedback bits per report may be important to improve efficiency. In various embodiments, multiple-input multiple-output ("MIMO") may include multiple transmission and reception points ("TRP") ("multi-TRP") and multi-panel transmissions. The purpose of multi-panel transmission may be to improve a spectral efficiency as well as a reliability and robustness of a connection in different scenarios, and may cover both ideal and nonideal backhaul. For increasing the reliability using multi-panel, ultra-reliable low-latency communication ("URLLC") under multi-panel transmission may be used, where the UE may be served by multiple TRPs forming a coordination cluster, possibly connected to a central processing unit.

In some embodiments, the presence of K TRPs may trigger up to K+

$$\binom{K}{n}$$

possible transmission hypothesis, where $$\binom{K}{n}$$

represents the binomial coefficient representing the number of unordered n-tuples selected from a set of K elements, where n≤K.

In various embodiments, for the purpose of CSI codebook enhancement for multi-panel transmission, the following may be achieved: 1) codebook enhancements for non-identical panels (e.g., different number of ports, antenna spacing); 2) provide solutions that can fit for both codebook selection (e.g., assuming panel selection), and joint codebook reporting (e.g., for joint panel transmission); and/or 3) multi-resolution codebook solutions for different applications.

In certain embodiments, there may be different NR codebook types. Details about different NR codebook types are provided herein.

In some embodiments, there is an NR Type-II codebook. In such embodiments, assume the gNB is equipped with a 2D antenna array with N1, N2 antenna ports per polarization placed horizontally and vertically and communication occurs over N3 PMI sub-bands. A PMI subband consists of a set of resource blocks, each resource block consisting of a set of subcarriers. In such case, 2N1N2 CSI-RS ports are utilized to enable DL channel estimation with high resolution for NR Rel. 15 Type-II codebook. In order to reduce the UL feedback overhead, a DFT-based CSI compression of the spatial domain is applied to L dimensions per polarization, where L<N1N2. In the sequel the indices of the 2 L dimensions are referred as the SD basis indices. The magnitude and phase values of the linear combination coefficients for each sub-band are fed back to the gNB as part of the CSI report. The 2N1N2×N3 codebook per layer takes on the form: $W=W_1W_2$, where W1 is a 2N1N2×2 L block-diagonal matrix (L<N1N2) with two identical diagonal blocks, i.e., $$W_1 = \begin{bmatrix} B & 0 \\ 0 & B \end{bmatrix},$$

and B is an N1N2×L matrix with columns drawn from a 2D oversampled DFT matrix, as follows:

$$u_m = \left[\,1 \quad e^{j\frac{2\pi m}{O_2N_2}} \quad \ldots \quad e^{j\frac{2\pi m(N_2-1)}{O_2N_2}}\,\right],$$

$$v_{l,m} = \left[\,u_m \quad e^{j\frac{2\pi l}{O_1N_1}}u_m \quad \ldots \quad e^{j\frac{2\pi l(N_1-1)}{O_1N_1}}u_m\,\right]^T,$$

$$B = [\,v_{l_0,m_0} \quad v_{l_1,m_1} \quad \cdots \quad v_{l_{L-1},m_{L-1}}\,],$$

$$l_i = O_1n_1^{(i)} + q_1,\ 0 \le n_1^{(i)} < N_1,\ 0 \le q_1 < O_1 - 1,$$

$$m_i = O_2n_2^{(i)} + q_2,\ 0 \le n_2^{(i)} < N_2,\ 0 \le q_2 < O_2 - 1,$$

where the superscript T denotes a matrix transposition operation. Note that O1, O2 oversampling factors are assumed for the 2D DFT matrix from which matrix B is drawn. Note that W1 is common across all layers. W2 is a 2L×N3 matrix, where the ith column corresponds to the linear combination coefficients of the 2 L beams in the ith sub-band. Only the indices of the L selected columns of B are reported, along with the oversampling index taking on O1O2 values. Note that W2 are independent for different layers.

In various embodiments, there may be an NR Type-II port selection codebook. In such embodiments, for Type-II port selection codebook, only K (where K≤2N1N2) beamformed CSI-RS ports are utilized in DL transmission, in order to reduce complexity. The K×N3 codebook matrix per layer takes on the form:

$$W = W_1^{PS}W_2.$$

Here, $W_2$ follow the same structure as the conventional NR Rel. 15 Type-II Codebook and are layer specific.

$$W_1^{PS}$$

is a K×2 L block-diagonal matrix with two identical diagonal blocks, i.e., $$W_1^{PS} = \begin{bmatrix} E & 0 \\ 0 & E \end{bmatrix},$$

and E is an $$\frac{K}{2} \times L$$

matrix whose columns are standard unit vectors, as follows:

$$E = \left[\,e^{(K/2)}_{mod(m_{PS}d_{PS},K/2)} \quad e^{(K/2)}_{mod(m_{PS}d_{PS}+1,K/2)} \quad \cdots \quad e^{(K/2)}_{mod(m_{PS}d_{PS}+L-1,K/2)}\,\right],$$

where $$e_i^{(K)}$$

is a standard unit vector with a 1 at the ith location. Here dPS is an RRC parameter which takes on the values {1,2,3,4} under the condition dPS≤min(K/2, L), whereas mPS takes on the values $$\left\{0, \ldots, \left\lceil \frac{K}{2d_{PS}} \right\rceil - 1\right\}$$

and is reported as part of the UL CSI feedback overhead. W1 is common across all layers. For K=16, L=4 and dPS=1, the 8 possible realizations of E corresponding to mPS={0, 1, . . . , 7} are as follows:

$$\begin{bmatrix} 1&0&0&0\\0&1&0&0\\0&0&1&0\\0&0&0&1\\0&0&0&0\\0&0&0&0\\0&0&0&0\\0&0&0&0 \end{bmatrix}, \begin{bmatrix} 0&0&0&0\\1&0&0&0\\0&1&0&0\\0&0&1&0\\0&0&0&1\\0&0&0&0\\0&0&0&0\\0&0&0&0 \end{bmatrix}, \begin{bmatrix} 0&0&0&0\\0&0&0&0\\1&0&0&0\\0&1&0&0\\0&0&1&0\\0&0&0&1\\0&0&0&0\\0&0&0&0 \end{bmatrix}, \begin{bmatrix} 0&0&0&0\\0&0&0&0\\0&0&0&0\\1&0&0&0\\0&1&0&0\\0&0&1&0\\0&0&0&1\\0&0&0&0 \end{bmatrix}, \begin{bmatrix} 0&0&0&0\\0&0&0&0\\0&0&0&0\\0&0&0&0\\1&0&0&0\\0&1&0&0\\0&0&1&0\\0&0&0&1 \end{bmatrix},$$

$$\begin{bmatrix} 0&0&0&1\\0&0&0&0\\0&0&0&0\\0&0&0&0\\0&0&0&0\\1&0&0&0\\0&1&0&0\\0&0&1&0 \end{bmatrix}, \begin{bmatrix} 0&0&1&0\\0&0&0&1\\0&0&0&0\\0&0&0&0\\0&0&0&0\\0&0&0&0\\1&0&0&0\\0&1&0&0 \end{bmatrix}, \begin{bmatrix} 0&1&0&0\\0&0&1&0\\0&0&0&1\\0&0&0&0\\0&0&0&0\\0&0&0&0\\0&0&0&0\\1&0&0&0 \end{bmatrix}.$$

When dPS=2, the 4 possible realizations of E corresponding to mPS={0,1,2,3} are as follows:

$$\begin{bmatrix} 1&0&0&0\\0&1&0&0\\0&0&1&0\\0&0&0&1\\0&0&0&0\\0&0&0&0\\0&0&0&0\\0&0&0&0 \end{bmatrix}, \begin{bmatrix} 0&0&0&0\\0&0&0&0\\1&0&0&0\\0&1&0&0\\0&0&1&0\\0&0&0&1\\0&0&0&0\\0&0&0&0 \end{bmatrix}, \begin{bmatrix} 0&0&0&0\\0&0&0&0\\0&0&0&0\\0&0&0&0\\1&0&0&0\\0&1&0&0\\0&0&1&0\\0&0&0&1 \end{bmatrix}, \begin{bmatrix} 0&0&1&0\\0&0&0&1\\0&0&0&0\\0&0&0&0\\0&0&0&0\\0&0&0&0\\1&0&0&0\\0&1&0&0 \end{bmatrix}.$$

When dPS=3, the 3 possible realizations of E corresponding of mPS={0,1,2} are as follows:

$$\begin{bmatrix} 1&0&0&0\\0&1&0&0\\0&0&1&0\\0&0&0&1\\0&0&0&0\\0&0&0&0\\0&0&0&0\\0&0&0&0 \end{bmatrix}, \begin{bmatrix} 0&0&0&0\\0&0&0&0\\0&0&0&0\\1&0&0&0\\0&1&0&0\\0&0&1&0\\0&0&0&1\\0&0&0&0 \end{bmatrix}, \begin{bmatrix} 0&0&1&0\\0&0&0&1\\0&0&0&0\\0&0&0&0\\0&0&0&0\\0&0&0&0\\1&0&0&0\\0&1&0&0 \end{bmatrix}.$$

When dPS=4, the 2 possible realizations of E corresponding of mPS={0,1} are as follows:

$$\begin{bmatrix} 1&0&0&0\\0&1&0&0\\0&0&1&0\\0&0&0&1\\0&0&0&0\\0&0&0&0\\0&0&0&0\\0&0&0&0 \end{bmatrix}, \begin{bmatrix} 0&0&0&0\\0&0&0&0\\0&0&0&0\\0&0&0&0\\1&0&0&0\\0&1&0&0\\0&0&1&0\\0&0&0&1 \end{bmatrix}.$$

To summarize, mPS parametrizes the location of the first 1 in the first column of E, whereas dPS represents the row shift corresponding to different values of mPS.

In various embodiments, there may be an NR Type-I codebook. In such embodiments, NR Type-I codebook is the baseline codebook for NR, with a variety of configurations. The most common utility of Type-I codebook is a special case of NR Type-II codebook with L=1 for RI=1, 2, wherein a phase coupling value is reported for each sub-band, i.e., W2 is 2×N3, with the first row equal to [1, 1, . . . , 1] and the second row equal to [$e^{j2\pi\varnothing_0}$, . . . , $e^{j2\pi\varnothing_{N3-1}}$]. Under specific configurations, ϕ0=ϕ1 . . . =ϕ, i.e., wideband reporting. For RI>2 different beams are used for each pair of layers. Obviously, NR Rel. 15 Type-I codebook can be depicted as a low-resolution version of NR Rel. 15 Type-II codebook with spatial beam selection per layer-pair and phase combining only. More details on NR Rel. 15 Type-I codebook can be found.

In certain embodiments, there may be an NR Type-II codebook. In such embodiments, assume the gNB is equipped with a two-dimensional (2D) antenna array with N1, N2 antenna ports per polarization placed horizontally and vertically and communication occurs over N3 PMI sub-bands. A PMI sub-band consists of a set of resource blocks, each resource block consisting of a set of subcarriers. In such case, 2N1N2N3 CSI-RS ports are utilized to enable DL channel estimation with high resolution for NR Type-II codebook. In order to reduce the UL feedback overhead, a Discrete Fourier transform (DFT)-based CSI compression of the spatial domain is applied to L dimensions per polarization, where L<N1N2. Similarly, additional compression in the frequency domain is applied, where each beam of the frequency-domain precoding vectors is transformed using an inverse DFT matrix to the delay domain, and the magnitude and phase values of a subset of the delay-domain coefficients are selected and fed back to the gNB as part of the CSI report. The 2N1N2×N3 codebook per layer takes on the form:

$$W = W_1 \tilde{W}_2 W_f^H,$$

where W1 is a 2N1N2×2 L block-diagonal matrix (L<N1N2) with two identical diagonal blocks, i.e., $$W_1 = \begin{bmatrix} B & 0 \\ 0 & B \end{bmatrix},$$

and B is an N1N2×L matrix with columns drawn from a 2D oversampled DFT matrix, as follows:

$$u_m = \begin{bmatrix} 1 & e^{j\frac{2\pi m}{O_2 N_2}} & \ldots & e^{j\frac{2\pi m(N_2-1)}{O_2 N_2}} \end{bmatrix},$$

-continued $$v_{l,m}=\left[u_m\ e^{j\frac{2\pi l}{O_1N_1}}u_m\ \ldots\ e^{j\frac{2\pi l(N_1-1)}{O_1N_1}}u_m\right]^T,$$

$$B=[v_{l_0,m_0}\ v_{l_1,m_1}\ \cdots\ v_{l_{L-1},m_{L-1}}],$$

$$l_i=O_1n_1^{(i)}+q_1,\ 0\le n_1^{(i)}<N_1,\ 0\le q_1<O_1-1,$$

$$m_i=O_2n_2^{(i)}+q_2,\ 0\le n_2^{(i)}<N_2,\ 0\le q_2<O_2-1,$$

where the superscript T denotes a matrix transposition operation. Note that O1, O2 oversampling factors are assumed for the 2D DFT matrix from which matrix B is drawn. Note that W1 is common across all layers. Wf is an N3×M matrix (M<N3) with columns selected from a critically sampled size-N3 DFT matrix, as follows:

$$W_f=[f_{k_0}\ f_{k_1}\ \cdots\ f_{k_{M'-1}}],\ 0\le k_i<N_3-1,$$

$$f_k=\left[1\ e^{-j\frac{2\pi k}{N_3}}\ \ldots\ e^{-j\frac{2\pi k(N_3-1)}{N_3}}\right]^T.$$

Only the indices of the L selected columns of B are reported, along with the oversampling index taking on O1O2 values. Similarly, for WF, only the indices of the M selected columns out of the predefined size-N3 DFT matrix are reported. In the sequel the indices of the M dimensions are referred as the selected Frequency Domain (FD) basis indices. Hence, L, M represent the equivalent spatial and frequency dimensions after compression, respectively. Finally, the 2L×M matrix $\tilde{W}_2$ represents the linear combination coefficients (LCCs) of the spatial and frequency DFT-basis vectors. Both $\tilde{W}_2$, Wf are selected independent for different layers. Magnitude and phase values of an approximately β fraction of the 2 LM available coefficients are reported to the gNB (β<1) as part of the CSI report. Coefficients with zero magnitude are indicated via a per-layer bitmap. Since all coefficients reported within a layer are normalized with respect to the coefficient with the largest magnitude (strongest coefficient), the relative value of that coefficient is set to unity, and no magnitude or phase information is explicitly reported for this coefficient. Only an indication of the index of the strongest coefficient per layer is reported. Hence, for a single-layer transmission, magnitude and phase values of a maximum of $\lceil 2\beta LM\rceil-1$ coefficients (along with the indices of selected L, M DFT vectors) are reported per layer, leading to significant reduction in CSI report size, compared with reporting 2N1N2×N3−1 coefficients' information.

In some embodiments, there may be an NR Type-II port selection codebook. For Type-II port selection codebook, only K (where K≤2N1N2) beamformed CSI-RS ports are utilized in DL transmission, in order to reduce complexity. The K×N3 codebook matrix per layer takes on the form:

$$W=W_1^{PS}\tilde{W}_2W_f^H.$$

Here, $\tilde{W}_2$ and W3 follow the same structure as the conventional NR Rel. 16 Type-II Codebook, where both are layer specific. The matrix $$W_1^{PS}$$

is a K×2 L block-diagonal matrix with the same structure as that in the NR Type-II port selection codebook.

In various embodiments, there may be codebook reporting. The codebook report is partitioned into two parts based on the priority of information reported. Each part is encoded separately (Part 1 has a possibly higher code rate).

In certain embodiments, there may be a content of a CSI report as follows. Part 1: rank indicator ("RI")+CQI+Total number of coefficients. Part 2: SD basis indicator+FD basis indicator/layer+Bitmap/layer+Coefficient Amplitude info/layer+Coefficient Phase info/layer+Strongest coefficient indicator/layer. Furthermore, Part 2 CSI can be decomposed into sub-parts each with different priority (higher priority information listed first). Such partitioning is required to allow dynamic reporting size for codebook based on available resources in the uplink phase. Also Type-II codebook is based on aperiodic CSI reporting, and only reported in physical uplink shared channel ("PUSCH") via downlink control information ("DCI") triggering (one exception). Type-I codebook can be based on periodic CSI reporting (physical uplink control channel ("PUCCH")) or semi-persistent CSI reporting (PUSCH or PUCCH) or aperiodic reporting (PUSCH).

In some embodiments, there may be priority reporting for Part 2 CSI. It should be noted that multiple CSI reports may be transmitted as shown in Table 1.

TABLE 1

| CSI Reports priority ordering |
|---|
| Priority 0:<br>For CSI reports 1 to $N_{Rep}$, Group 0 CSI for CSI reports configured as 'typeII-r16' or 'typeII-PortSelection-r16'; Part 2 wideband CSI for CSI reports configured otherwise |
| Priority 1:<br>Group 1 CSI for CSI report 1, if configured as 'typeII-r16' or 'typeII-PortSelection-r16'; Part 2 subband CSI of even subbands for CSI report 1, if configured otherwise |
| Priority 2:<br>Group 2 CSI for CSI report 1, if configured as 'typeII-r16' or 'typeII-PortSelection-r16'; Part 2 subband CSI of odd subbands for CSI report 1, if configured otherwise |
| Priority 3:<br>Group 1 CSI for CSI report 2, if configured as 'typeII-r16' or 'typeII-PortSelection-r16'; Part 2 subband CSI of even subbands for CSI report 2, if configured otherwise |
| Priority 4:<br>Group 2 CSI for CSI report 2, if configured as 'typeII-r16' or 'typeII-PortSelection-r16'. Part 2 subband CSI of odd subbands for CSI report 2, if configured otherwise |
| .<br>.<br>. |
| Priority $2N_{Rep}-1$:<br>Group 1 CSI for CSI report $N_{Rep}$, if configured as 'typeII-r16' or 'typeII-PortSelection-r16'; Part 2 subband CSI of even subbands for CSI report $N_{Rep}$, if configured otherwise |
| Priority $2N_{Rep}$:<br>Group 2 CSI for CSI report $N_{Rep}$, if configured as 'typeII-r16' or 'typeII-PortSelection-r16'; Part 2 subband CSI of odd subbands for CSI report $N_{Rep}$, if configured otherwise |

It should be noted that the priority of the NRep CSI reports are based on the following. A CSI report corresponding to one CSI reporting configuration for one cell may have higher priority compared with another CSI report corresponding to one other CSI reporting configuration for the same cell. CSI reports intended to one cell may have higher priority compared with other CSI reports intended to another cell. CSI reports may have higher priority based on the CSI report content (e.g., CSI reports carrying L1-RSRP information have higher priority). CSI reports may have higher priority based on their type (e.g., whether the CSI report is aperiodic, semi-persistent or periodic, and whether the report is sent via PUSCH or PUCCH, may impact the priority of the CSI report).

In light of that, CSI reports may be prioritized as follows, where CSI reports with lower IDs have higher priority: $Pri_{iCSI}(y, k, c, s)=2\cdot N_{cells}\cdot M_s\cdot y+N_{cells}\cdot M_s\cdot k+M_s\cdot C+s$, s: CSI reporting configuration index, and Ms: Maximum number of CSI reporting configurations, c: Cell index, and Ncells: Number of serving cells, k: 0 for CSI reports carrying layer 1 ("L1") reference signal received power ("RSRP") ("L1-RSRP") or L1 signal-to-interference and noise ratio ("SINR") ("L1-SINR"), 1 otherwise, y: 0 for aperiodic reports, 1 for semi-persistent reports on PUSCH, 2 for semi-persistent reports on PUCCH, 3 for periodic reports.

In some embodiments, there may be a UCI bit sequence generation. The CSI report content in UCI, whether on PUCCH or PUSCH, may be provided in detail. The Rank Indicator (RI), if reported, has bitwidth of $\min(\lceil \log_2 N_{ports} \rceil, \lceil \log_2 n_{RI} \rceil)$, where Nports, nRI represent the number of antenna ports and the number of allowed rank indicator values, respectively. On the other hand, the CSI reference signal ("RS") ("CSI-RS") resource indicator ("CRI") and the Synchronization Signal Block Resource Indicator ("SSBRI") each have bitwidths of $$\lceil \log_2 K_s^{CSI-RS} \rceil, \lceil \log_2 K_S^{SSB} \rceil,$$

respectively, where $$K_s^{CSI-RS}$$

is the number of CSI-RS resources in the corresponding resource set, and $$K_s^{SSB}$$

is the configured number of synchronization signal and/or physical broadcast channel ("SS/PBCH") blocks in the corresponding resource set for reporting 'ssb-Index-RSRP'. The mapping order of CSI fields of one CSI report with wideband PMI and wideband CQI on PUCCH is depicted in Table 2.

TABLE 2

Mapping order of CSI fields of one CSI report with wideband PMI and CQI on PUCCH

| CSI report number | CSI fields |
|---|---|
| CSI report #n | CRI, if reported<br>Rank Indicator, if reported<br>Layer Indicator, if reported<br>Zero padding bits, if needed<br>PMI wideband information fields, if reported<br>PMI wideband information, if reported<br>Wideband CQI for the first Transport Block, if reported<br>Wideband CQI for the second Transport Block, if reported |

TABLE 2-continued

It should be noted that one or more elements or features from one or more embodiments may be combined.

In certain embodiments used herein, the "panel" notion includes a panel, a set of antennas, a set of antenna ports, a CSI-RS group uniform linear array, an antenna sub-array, a cell, a node, a TRP, a communication (e.g., signals and/or channels) associated with a control resource set ("CORESET") pool, and/or a communication associated with a TCI state from a transmission configuration comprising at least two TCI states.

Furthermore, as used herein, a codebook type used is arbitrary such that there may be a flexibility for use of different codebook types (e.g., Type-I and Type-II codebooks), unless otherwise stated.

In some embodiments, there may be CSI reporting configuration and feedback for a multi-panel codebook. A UE, in such embodiments, is configured by higher layers with a CSI-ReportConfig reporting setting for CSI reporting, one or more CSI-ResourceConfig resource settings for CSI measurement, and one or two lists of trigger states (e.g., given by the higher layer parameters CSI-AperiodicTriggerStateList and CSI-SemiPersistentOnPUSCH-TriggerStateList). Each trigger state in CSI-AperiodicTriggerStateList may contain a list of a subset of the associated CSI-ReportConfigs indicating the resource set IDs for channel and optionally for interference. Each trigger state in CSI-SemiPersistentOnPUSCH-TriggerStateList may contain one or more associated CSI-ReportConfig. Different embodiments for indication of multi-panel transmission are provided herein. A setup with a combination of one or more of embodiments herein is not precluded.

In a first set of embodiments, there may be a configuration of multi-panel codebook feedback. Different embodiments for indication of multi-TRP transmission are provided herein. A setup with a combination of one or more embodiments herein is not precluded.

In a first embodiment of the first set of embodiments, a UE configured with multi-panel codebook transmission may be configured with a CSI reporting setting CSI-ReportConfig that includes a higher-laver parameter (e.g., mPanel-Codebook-Enabled) that configures the UE with multi-panel codebook feedback. FIG. 4 is a schematic block diagram illustrating one embodiment of abstract syntax notation 1 ("ASN.1") code 400 for a CSI-ReportConfig reporting setting IE with a multi-TRP transmission indication according to the first embodiment of the first set of embodiments.

In a second embodiment of the first set of embodiments, a UE configured with multi-TRP transmission may be configured with a CSI reporting setting CSI-ReportConfig that includes a higher-layer parameter which triggers the UE to report multiple PMI values (e.g., nPMI) in the CSI-ReportConfig reporting setting or any of its elements (e.g., codebookConfig). FIG. 5 is a schematic block diagram illustrating one embodiment of ASN.1 code 500 for triggering more than one CSI report within a CSI-ReportConfig reporting setting IE according to the second embodiment of the first set of embodiments. FIG. 6 is a schematic block diagram illustrating another embodiment of ASN.1 code 600 for triggering two CSI reports within a CodebookConfig codebook configuration IE according to the second embodiment of the first set of embodiments.

In a third embodiment of the first set of embodiments, a UE configured with multi-panel codebook feedback may be configured with a CSI reporting setting CSI-ReportConfig that configures two or more CodebookConfig codebook configurations corresponding to one or more CSI report quantities (e.g., one or more CSI reports), or PMI values or codebooks. FIG. 7 is a schematic block diagram illustrating one embodiment of ASN.1 code 700 for triggering two CSI reports within a CSI-ReportConfig reporting setting IE according to the third embodiment of the first set of embodiments.

In a fourth embodiment of the first set of embodiments, a UE configured with multi-panel codebook feedback may be configured with a CSI reporting setting CSI-ReportConfig that configures two or more reportQuantity report quantities. FIG. 8 is a schematic block diagram illustrating one embodiment of ASN.1 code 800 for triggering two CSI reports within a CSI-ReportConfig reporting setting IE according to the fourth embodiment of the first set of embodiments.

In a fifth embodiment of the first set of embodiments, a UE configured with multi-panel codebook feedback may be configured with multiple TCI states corresponding to the multiple panels CSI-RS resource grouping for multi-panel codebook feedback.

In a second set of embodiments, a UE may be configured with a CSI reporting setting CSI-ReportConfig that triggers codebook feedback for one or more panels based on one or more CSI-RS groups. Different embodiments for the characterization of such CSI-RS groups are found herein. A setup with a combination of one or more of the embodiments herein is not precluded.

In a first embodiment of the second set of embodiments, a CSI-RS group includes one or more CSI-RS resources. In a first example, a setup with two CSI-RS groups corresponds to two distinct CSI-RS resources. For example, a first CSI-RS group includes a first set of CSI-RS resources, and a second CSI-RS group includes a second set of CSI-RS resources. At least one CSI-RS resource in the first set and second set of CSI-RS resources are distinct. In a second example, the CSI-RS resources have non-zero power and are used for channel measurement.

In a second embodiment of the second set of embodiments, a CSI-RS group is a set of non-zero power ("NZP") CSI-RS ports. In a first example, two or more sets of NZP CSI-RS ports corresponding to the two or more CSI-RS groups belong to the same CSI-RS resource. In a second example, the two sets of NZP CSI-RS ports are disjointed.

In a third embodiment of the second set of embodiments, a CSI-RS group for a first panel is a subset of the CSI-RS group for a second panel. In one example, the set of NZP CSI-RS ports for the first panel is a subset of the set of NZP CSI-RS ports for the second panel.

In a fourth embodiment of the second set of embodiments, a CSI-RS group for a first panel is the same CSI-RS group for a second panel. In a first example, only one CSI-RS group is defined.

In various embodiments, there may be parameters for multi-panel codebook. In general, a codebook configuration includes several parameters that are configured by the network for which one or more values may be reported as part of CSI feedback. For codebook configurations under a multi-panel setup, the configuration of these parameters and the reporting of their values, if applicable, may take on different values and formats compared with legacy codebook configurations. Different embodiments for the characterization of these parameters and their corresponding values are provided herein. A setup with a combination of one or more of the embodiments herein is not precluded. A panel may correspond to a CSI-RS group.

In a third set of embodiments, there may be a beam parameter. For multi-panel systems (e.g., two panels), two values for the number of beams $L_1$, $L_2$ for a first and second panel, respectively, are identified, wherein a total number of beams $L \triangleq L_1+L_2$ is either higher-layer configured (e.g., radio resource control ("RRC") signaling or medium access control ("MAC") control element ("MAC-CE") signaling), set, or UE-indicated.

In a first embodiment of the third set of embodiments, values of a number of beams (e.g., $L_1$, $L_2$) are higher-layer configured. In a first example, the higher-layer configuration is based on RRC signaling. In a second example, the higher-layer configuration is based on MAC-CE signaling. In a third example, the values of beam sizes $L_1$, $L_2$, are indicated via a bitmap.

In a second embodiment of the third set of embodiments, values of a number of beams $L_1$, $L_2$, are indicated (or signaled, e.g., as part of CSI feedback reporting) by a UE. In one example, a table of possible pair values that satisfy $L_1+L_2=Z$ is provided, e.g., if L=6, only the combinations $(L_1, L_2)=\{(2,4), (3,3), (4,2)\}$ are supported.

In a third embodiment of the third set of embodiments, values of a number of beams $L_1$, $L_2$, are pre-defined by a rule. In a first example, a rule related to the values of number of beams $L_1$, $L_2$, states that $|L_1-L_2|\leq 1$. In a second example, a rule related to the values of the number of beams $L_1$, $L_2$, states that $L_1 \geq L_2$.

In a fourth embodiment of the third set of embodiments, the two beam sets including the $L_1$, $L_2$ beams (e.g., first beam set comprising $L_1$ beams, second beam set comprising $L_2$ beams) are not disjointed. In a first example, a beam/may exist in the two sets of beams. In a second example, a sub-set of common beams across the two sets of beams is defined.

In a fifth embodiment of the third set of embodiments, two codebook subset restriction ("CBSR") sets are defined. In a first example, a first set of CBSR is associated with the first set of beams, and a second set of CBSR is associated with the second set of beams.

In a sixth embodiment of the third set of embodiments, two oversampling factors are defined, one for each set of beams. In a first example, a setup with P sets of beams with a number of beams $L_p$ in the $p^{th}$ set, where p=1, . . . , P, each identified from a set of $N_{1,p}N_{2,p}$ antenna ports, are identified by the indices $i_{1,1}$, $i_{1,2}$, as follows:

$$i_{1,1,p} = [\,q_{1,p} \quad q_{2,p}\,],\ q_{1,p} \in \{0, 1, \ldots , O_1-1\},$$

$$q_{2,p} \in \{0, 1, \ldots , O_2-1\},\ i_{1,2,p} \in \left\{0, 1, \ldots , \binom{N_{1,p}N_{2,p}}{L_p}-1\right\},$$

$$i_{1,1} = [i_{1,1,1}, \ldots , i_{1,1,P}], \text{ and } i_{1,2} = [i_{1,2,1}, \ldots , i_{1,2,P}].$$

In a seventh embodiment of the third set of embodiments, each beam is sampled from a column of a Fourier-based transformation matrix. In a first example, the Fourier-based transformation matrix is a discrete Fourier transform ("DFT")-based matrix with x dimensions, with x taking on a value from {1,2,3}. When x=2 (e.g., a two-dimensional DFT-based transformation is applied), the columns of the DFT matrix are as follows:

$$u_{m_p}=\left[\begin{array}{cccc}1 & e^{j\frac{2\pi m_p}{O_2N_{2,p}}} & \dots & e^{j\frac{2\pi m_p(N_{2,p}-1)}{O_2N_{2,p}}}\end{array}\right],$$

$$v_{l_p,m_p}=\left[\begin{array}{cccc}u_{m_p} & e^{j\frac{2\pi l_p}{O_1N_{1,p}}}u_{m_p} & \dots & e^{j\frac{2\pi l_p(N_{1,p}-1)}{O_1N_{1,p}}}u_{m_p}\end{array}\right]^T,$$

$$B=\left[\begin{array}{cccc}v_{l_{p,0},m_{p,0}} & v_{l_{p,1},m_{p,1}} & \cdots & v_{l_{p,L_p-1},m_{p,L_p-1}}\end{array}\right],$$

$$l_{p,i}=O_1n_1^{(i)}+q_{1,p},\ 0\le n_{1,p}^{(i)}<N_{1,p},\ 0\le q_{1,p}<O_1-1,$$

$$m_{p,i}=O_2n_2^{(i)}+q_{2,p},\ 0\le n_{2,p}^{(i)}<N_{2,p},\ 0\le q_{2,p}<O_2-1.$$

In a fourth set of embodiments, there may be a precoding matrix structure. In general, a codebook may be represented in the form of a matrix equation that defines the precoder structure for one or more layers as well as for one or more panels as well. Different embodiments for the codebook characterization and their corresponding variations are provided herein. A setup with a combination of one or more of the embodiments herein is not precluded.

In a first embodiment of the fourth set of embodiments, one codebook is defined for each panel. In one example, a number of codebooks is the same as a number of selected panels. In a first example, a codebook for panel p with two layers is defined as:

$$W^{(2),p}_{q_1,q_2,n_1,n_2,n_{3,1},p_1^{(1)},p_1^{(2)},i_{2,5,1},n_{3,2},p_2^{(1)},p_2^{(2)},i_{2,5,2},t}=\frac{1}{\sqrt{2}}\left[\begin{array}{cc}W^{1,p}_{q_1,q_2,n_1,n_2,n_{3,1},p_1^{(1)},p_1^{(2)},i_{2,5,1},t} & W^{2,p}_{q_1,q_2,n_1,n_2,n_{3,2},p_2^{(1)},p_2^{(2)},i_{2,5,2},t}\end{array}\right],$$

wherein $W^{l,p}_{q_1,q_2,n_1,n_2,n_{3,1},p_1^{(1)},p_1^{(2)},i_{2,5,1},t}$ is the layer l codebook for panel p, and wherein the panel index p in the subscript takes on the values p=1, . . . , P for a system with P panels, and the aforementioned codebook equation is an extension of an enhanced Type-II codebook.

In a second embodiment of the fourth set of embodiments, one codebook that includes a beam-space matrix is defined for all P panels. In a first example, a system with three panels has the beam-space matrix decomposed into three submatrices as follows:

$$W_1=\left[\begin{array}{c}W_{1,1}\\ W_{1,2}\\ W_{1,3}\end{array}\right],$$

wherein the layer l codebook (e.g., in terms of an extension of an enhanced Type-II codebook) would be characterized with a summation of beam coefficients over the panels, as follows:

$$W^l_{q_1,q_2,n_1,n_2,n_3,p_l^{(1)},p_l^{(2)},i_{2,5,l},t}=\frac{1}{\sqrt{N_1N_2\gamma_{t,l}}}\left[\begin{array}{c}\sum_{p=1}^{P}\sum_{i=0}^{L-1}v_{p,m_1^{(i)},m_2^{(i)}}p_{p,l,0}^{(1)}\sum_{f=0}^{M_v-1}y_{p,t,l}^{(f)}p_{p,l,i,f}^{(2)}\varphi_{p,l,i,f}\\ \sum_{p=1}^{P}\sum_{i=0}^{L-1}v_{p,m_1^{(i)},m_2^{(i)}}p_{p,l,1}^{(1)}\sum_{f=0}^{M_v-1}y_{p,t,l}^{(f)}p_{p,l,i+L,f}^{(2)}\varphi_{p,l,i+L,f}\end{array}\right],$$

-continued $$l=1,2,3,4,\ \gamma_{t,l}=\sum_{p=1}^{P}\sum_{i=0}^{2L-1}\left(p_{p,l,\lfloor\frac{i}{L}\rfloor}^{(1)}\right)^2\left|\sum_{f=0}^{M_v-1}y_{p,t,l}^{(f)}p_{p,l,i,f}^{(2)}\varphi_{p,l,i,f}\right|^2.$$

In a third embodiment of the fourth set of embodiments, a matrix $W_{1,p}$ for Panel p is either higher-layer configured, UE indicated, or fixed by a rule, to DFT-based column vectors, singular-value decomposition-based column vectors, or freely-selected column vectors. In a first example, a UE reports one bit λ in Part 1 of CSI report that indicates whether a codebook is based on a DFT basis. In such embodiments, the codebook for layer l (e.g., in terms of an extension of an enhanced Type-II codebook) is in a form:

$$W^l_{q_1,q_2,n_1,n_2,n_3,p_l^{(1)},p_l^{(2)},i_{2,5,l},t}=\frac{1}{\sqrt{N_1N_2\gamma_{t,l}}}\left[\begin{array}{c}\sum_{p=1}^{P}\sum_{i=0}^{L-1}v_{p,m_1^{(i)},m_2^{(i)}}p_{p,l,0}^{(1)}\sum_{f=0}^{M_v-1}y_{p,t,l}^{(f)}p_{p,l,i,f}^{(2)}\varphi_{p,l,i,f}\\ \sum_{p=1}^{P}\sum_{i=0}^{L-1}v_{p,m_1^{(i)},m_2^{(i)}}p_{p,l,1}^{(1)}\sum_{f=0}^{M_v-1}y_{p,t,l}^{(f)}p_{p,l,i+L,f}^{(2)}\varphi_{p,l,i+L,f}\end{array}\right],$$

$$l=1,2,3,4,\ \gamma_{t,l}=\sum_{p=1}^{P}\sum_{i=0}^{2L-1}\left(p_{p,l,\lfloor\frac{i}{L}\rfloor}^{(1)}\right)^2\left|\sum_{f=0}^{M_v-1}y_{p,t,l}^{(f)}p_{p,l,i,f}^{(2)}\varphi_{p,l,i,f}\right|^2.$$

For DFT-based codebook when λ=0, or the codebook for layer/is in a form:

$$W^{l,p}_{n_{1,p},n_{2,p},t}=\frac{1}{\sqrt{N_1N_2\gamma_{t,l}}}\left[\begin{array}{c}p_{p,l,0}^{(1)}\sum_{f=0}^{M_v-1}y_{p,t,l}^{(f)}p_{p,n_{1,p},n_{2,p},l,f}^{(2)}\varphi_{p,n_{1,p},n_{2,p},l,f}\\ p_{p,l,1}^{(1)}\sum_{f=0}^{M_v-1}y_{p,t,l}^{(f)}p_{p,N_{1,p}+n_{1,p},N_{2,p}+n_{2,p},l,f}^{(2)}\varphi_{p,N_{1,p}+n_{1,p},N_{2,p}+n_{2,p},l,f}\end{array}\right],$$

$$l=1,2,3,4,\ \gamma_{t,l}=\left(p_{p,l,0}^{(1)}\right)^2\left|\sum_{f=0}^{M_v-1}y_{p,t,l}^{(f)}p_{p,n_{1,p},n_{2,p},l,f}^{(2)}\varphi_{p,n_{1,p},n_{2,p},l,f}\right|^2+\left(p_{p,l,1}^{(1)}\right)^2\left|\sum_{f=0}^{M_v-1}y_{p,t,l}^{(f)}p_{p,N_{1,p}+n_{1,p},N_{2,p}+n_{2,p},l,f}^{(2)}\varphi_{p,N_{1,p}+n_{1,p},N_{2,p}+n_{2,p},l,f}\right|^2,$$

and $W^l_{n_1,n_2,t}=\left\{W^{l,1}_{n_{1,1},n_{2,1},t},\ \dots,\ W^{l,P}_{n_{1,P},n_{2,P},t}\right\}$.

In a fourth embodiment of the fourth set of embodiments, an oversampling index is defined for a DFT matrix corresponding to a subset of panels from the P panels. In a first example, the subset of panels corresponds to P−1 panels. In a first example, the elements of a DFT matrix column for panel $$p,\ y_{p,t,l}^{(f)},$$

is in the form $$y_{p,t,l}=\left[y_{p,t,l}^{(0)}\ y_{p,t,l}^{(1)}\ \cdots\ y_{p,t,l}^{(M_v-1)}\right],$$

where t={0, 1, . . . , $O_3N_3-1$} is the index associated with the precoding matrix l={1, . . . , u}, p={1, . . . , P} and with $$y_{p,t,l}^{(f)}=e^{j\frac{2\pi z n_{3,l}^{(f)}}{N_3O_3}}$$

for f=0, 1, . . . , $M_u-1$, and $O_3$ is a higher-layer parameter that takes on the values {1,2,4}, wherein $z_i=O_3t+q_3$, $0\leq t<N_3$, $0\leq q_3<O_3-1$. In some examples, a first codebook may be defined for a first subset of panels, and a second codebook may be defined for a second subset of panels.

In a fifth set of embodiments, there may be a multi-resolution codebook.

In a first embodiment of the fifth set of embodiments, a multi-panel codebook with two or more panels has two codebook types defined. In one example, a first of two panels is configured with a Type-I codebook and a second of two panels is configured with a Type-II codebook.

In a second embodiment of the fifth set of embodiments, a multi-panel codebook is associated with up to two codewords, wherein the multiple panels are decomposed into two subsets of panels, a first of the two subsets of panels is associated with a first of the two codewords, and a second of the two subsets of panels is associated with a second of the two codewords. In one example, a system with three panels will be mapped with a first and second of the three panels associated with a first of the two codewords, and a third of the three panels associated with a second of the two codewords.

In a third embodiment of the fifth set of embodiments, a multi-panel codebook is associated with multiple layers, wherein the multiple panels are decomposed into two subsets of panels, the multiple layers are decomposed into two subsets of layers, a first of the two subsets of panels is associated with a first of the two subsets of layers, and a second of the two subsets of panels is associated with a second of the two subsets of layers. In a first example, a system with two panels that received feedback for a codebook with three layers will be mapped with a first and second of the three layers associated with a first of the two panels, and a third of the three layers associated with a second of the two panels. In a second example, a system with two panels that received feedback for a codebook with five layers will be mapped with a first, second, and third of the five layers associated with a first of the two panels, and a fourth and fifth of the five layers associated with a second of the two panels.

In a fourth embodiment of the fifth set of embodiments, a multi-panel codebook is associated with multiple beams, wherein the multiple panels are decomposed into two subsets of panels, the multiple beams are decomposed into two subsets of beams, a first of the two subsets of panels is associated with a first of the two subsets of beams, and a second of the two subsets of panels is associated with a second of the two subsets of beams. In a first example, a system with two panels will receive two sets of selected beam indices $B_1$, $B_2$, of sizes $L_1$, $L_2$, respectively. In a second example, the indices are reported in a combinatorial manner, e.g., with $$\left\lceil \log_2 \binom{N_{1,p}N_{2,p}}{L_p} \right\rceil$$

bits for panel p, where p={1,2}.

In a fifth embodiment of the fifth set of embodiments, a multi-panel codebook is associated with one codebook and one set of beams, wherein one panel is selected via higher-layer configuration. In one example, a UE is configured with a CSI reporting configuration that indicates an index of an NZP CSI-RS resource group that corresponds to a subset of the set of panels, wherein the subset of panels may be of size one, such that the indication is in the form of a $\lceil \log_2 P \rceil$-bit parameter. FIG. 9 is a schematic block diagram illustrating one embodiment of ASN.1 code 900 for indicating the index of an NZP CSI-RS resource corresponding to the selected panel within a CSI-ReportConfig reporting setting IE according to the sixth embodiment of the first set of embodiments.

In a sixth embodiment of the fifth set of embodiments, a multi-panel codebook is associated with one codebook and one set of beams, wherein one panel is selected via UE feedback. In one example, a UE reports $\lceil \log_2 P \rceil$ bits in Part 1 of a CSI report that indicates an index of an NZP CSI-RS group that corresponds to a subset of the set of P panels, e.g., the size of the subset of panels is one.

In some embodiments, the terms antenna, panel, and antenna panel are used interchangeably. An antenna panel may be hardware that is used for transmitting and/or receiving radio signals at frequencies lower than 6 GHZ (e.g., frequency range 1 ("FR1")), or higher than 6 GHz (e.g., frequency range 2 ("FR2") or millimeter wave ("mmWave")). In certain embodiments, an antenna panel may include an array of antenna elements. Each antenna element may be connected to hardware, such as a phase shifter, that enables a control module to apply spatial parameters for transmission and/or reception of signals. The resulting radiation pattern may be called a beam, which may or may not be unimodal and may allow the device to amplify signals that are transmitted or received from spatial directions.

In various embodiments, an antenna panel may or may not be virtualized as an antenna port. An antenna panel may be connected to a baseband processing module through a radio frequency ("RF") chain for each transmission (e.g., egress) and reception (e.g., ingress) direction. A capability of a device in terms of a number of antenna panels, their duplexing capabilities, their beamforming capabilities, and so forth, may or may not be transparent to other devices. In some embodiments, capability information may be communicated via signaling or capability information may be provided to devices without a need for signaling. If information is available to other devices the information may be used for signaling or local decision making.

In some embodiments, a UE antenna panel may be a physical or logical antenna array including a set of antenna elements or antenna ports that share a common or a significant portion of a radio frequency ("RF") chain (e.g., in-phase and/or quadrature ("I/Q") modulator, analog to digital ("A/D") converter, local oscillator, phase shift network). The UE antenna panel or UE panel may be a logical entity with physical UE antennas mapped to the logical entity. The mapping of physical UE antennas to the logical entity may be up to UE implementation. Communicating (e.g., receiving or transmitting) on at least a subset of antenna elements or antenna ports active for radiating energy (e.g., active elements) of an antenna panel may require biasing or powering on of an RF chain which results in current drain or power consumption in a UE associated with the antenna panel (e.g., including power amplifier and/or low noise amplifier ("LNA") power consumption associated with the antenna elements or antenna ports). The phrase "active for radiating energy," as used herein, is not meant to be limited to a transmit function but also encompasses a receive function. Accordingly, an antenna element that is active for radiating energy may be coupled to a transmitter to transmit radio frequency energy or to a receiver to receive radio frequency energy, either simultaneously or sequentially, or may be coupled to a transceiver in general, for performing its intended functionality. Communicating on the active elements of an antenna panel enables generation of radiation patterns or beams.

In certain embodiments, depending on a UE's own implementation, a "UE panel" may have at least one of the following functionalities as an operational role of unit of antenna group to control its transmit ("TX") beam independently, unit of antenna group to control its transmission power independently, and/pr unit of antenna group to control its transmission timing independently. The "UE panel" may be transparent to a gNB. For certain conditions, a gNB or network may assume that a mapping between a UE's physical antennas to the logical entity "UE panel" may not be changed. For example, a condition may include until the next update or report from UE or include a duration of time over which the gNB assumes there will be no change to mapping. A UE may report its UE capability with respect to the "UE panel" to the gNB or network. The UE capability may include at least the number of "UE panels." In one embodiment, a UE may support UL transmission from one beam within a panel. With multiple panels, more than one beam (e.g., one beam per panel) may be used for UL transmission. In another embodiment, more than one beam per panel may be supported and/or used for UL transmission.

In some embodiments, an antenna port may be defined such that a channel over which a symbol on the antenna port is conveyed may be inferred from the channel over which another symbol on the same antenna port is conveyed.

In certain embodiments, two antenna ports are said to be quasi co-located ("QCL") if large-scale properties of a channel over which a symbol on one antenna port is conveyed may be inferred from the channel over which a symbol on another antenna port is conveyed. Large-scale properties may include one or more of delay spread, Doppler spread, Doppler shift, average gain, average delay, and/or spatial receive ("RX") parameters. Two antenna ports may be quasi co-located with respect to a subset of the large-scale properties and different subset of large-scale properties may be indicated by a QCL Type. For example, a qcl-Type may take one of the following values: 1) 'QCL-TypeA': {Doppler shift, Doppler spread, average delay, delay spread}: 2) 'QCL-TypeB': {Doppler shift, Doppler spread}: 3) 'QCL-TypeC': {Doppler shift, average delay}; and 4) 'QCL-TypeD': {Spatial Rx parameter}. Other QCL-Types may be defined based on combination of one or large-scale properties.

In various embodiments, spatial RX parameters may include one or more of: angle of arrival ("AoA"), dominant AoA, average AoA, angular spread, power angular spectrum ("PAS") of AoA, average angle of departure ("AoD"), PAS of AoD, transmit and/or receive channel correlation, transmit and/or receive beamforming, and/or spatial channel correlation.

In certain embodiments, QCL-TypeA, QCL-TypeB, and QCL-TypeC may be applicable for all carrier frequencies, but QCL-TypeD may be applicable only in higher carrier frequencies (e.g., mmWave, FR2, and beyond), where the UE may not be able to perform omni-directional transmission (e.g., the UE would need to form beams for directional transmission). For a QCL-TypeD between two reference signals A and B, the reference signal A is considered to be spatially co-located with reference signal B and the UE may assume that the reference signals A and B can be received with the same spatial filter (e.g., with the same RX beamforming weights).

In some embodiments, an "antenna port" may be a logical port that may correspond to a beam (e.g., resulting from beamforming) or may correspond to a physical antenna on a device. In certain embodiments, a physical antenna may map directly to a single antenna port in which an antenna port corresponds to an actual physical antenna. In various embodiments, a set of physical antennas, a subset of physical antennas, an antenna set, an antenna array, or an antenna sub-array may be mapped to one or more antenna ports after applying complex weights and/or a cyclic delay to the signal on each physical antenna. The physical antenna set may have antennas from a single module or panel or from multiple modules or panels. The weights may be fixed as in an antenna virtualization scheme, such as cyclic delay diversity ("CDD"). A procedure used to derive antenna ports from physical antennas may be specific to a device implementation and transparent to other devices.

In certain embodiments, a transmission configuration indicator ("TCI") state ("TCI-state") associated with a target transmission may indicate parameters for configuring a quasi-co-location relationship between the target transmission (e.g., target RS of demodulation ("DM") reference signal ("RS") ("DM-RS") ports of the target transmission during a transmission occasion) and a source reference signal (e.g., synchronization signal block ("SSB"), CSI-RS, and/or sounding reference signal ("SRS")) with respect to quasi co-location type parameters indicated in a corresponding TCI state. The TCI describes which reference signals are used as a QCL source, and what QCL properties may be derived from each reference signal. A device may receive a configuration of a plurality of transmission configuration indicator states for a serving cell for transmissions on the serving cell. In some embodiments, a TCI state includes at least one source RS to provide a reference (e.g., UE assumption) for determining QCL and/or a spatial filter.

In some embodiments, spatial relation information associated with a target transmission may indicate a spatial setting between a target transmission and a reference RS (e.g., SSB, CSI-RS, and/or SRS). For example, a UE may transmit a target transmission with the same spatial domain filter used for receiving a reference RS (e.g., DL RS such as SSB and/or CSI-RS). In another example, a UE may transmit a target transmission with the same spatial domain transmission filter used for the transmission of a RS (e.g., UL RS such as SRS). A UE may receive a configuration of multiple spatial relation information configurations for a serving cell for transmissions on a serving cell.

Figure 10:
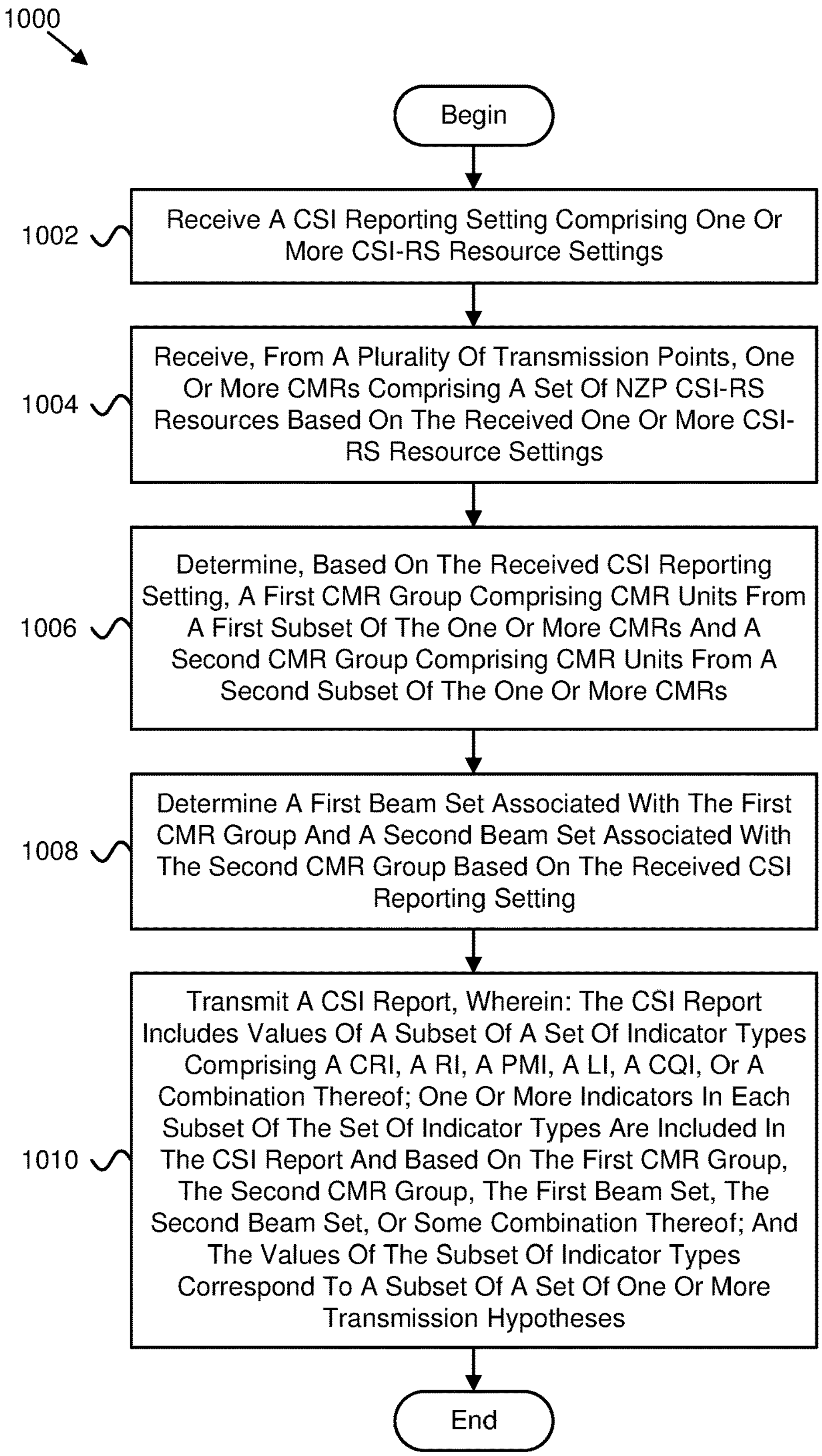
FIG. 10 is a flow chart diagram illustrating one embodiment of a method for transmitting a channel state information report.

FIG. 10 is a flow chart diagram illustrating one embodiment of a method 1000 for transmitting a channel state information report. In some embodiments, the method 1000 is performed by an apparatus, such as the remote unit 102. In certain embodiments, the method 1000 may be performed by a processor executing program code, for example, a microcontroller, a microprocessor, a CPU, a GPU, an auxiliary processing unit, a FPGA, or the like.

In various embodiments, the method 1000 includes receiving 1002, at a UE, a CSI reporting setting including one or more CSI-RS resource settings. In some embodiments, the method 1000 includes receiving 1004, from a plurality of transmission points, one or more CMRs including a set of NZP CSI-RS resources based on the received one or more CSI-RS resource settings. In certain embodiments, the method 1000 includes determining 1006, based on the received CSI reporting setting, a first CMR group including CMR units from a first subset of the one or more CMRs and a second CMR group including CMR units from a second subset of the one or more CMRs. In various embodiments, the method 1000 includes determining 1008 a first beam set associated with the first CMR group and a second beam set associated with the second CMR group based on the received CSI reporting setting. In some embodiments, the method 1000 includes transmitting 1010 a CSI report. The CSI report includes values of a subset of a set of indicator types including a CRI, a RI, a PMI, a LI, a CQI, or a combination thereof: one or more indicators in each subset of the set of indicator types are included in the CSI report and based on the first CMR group, the second CMR group, the first beam set, the second beam set, or some combination thereof; and the values of the subset of indicator types correspond to a subset of a set of one or more transmission hypotheses.

In certain embodiments, the CSI reporting setting includes one or more higher-layer parameters that associate the CSI reporting setting with at least one transmission hypothesis corresponding to joint transmission from multiple transmission points, including: a parameter that enables transmission from a plurality of transmission points: a parameter that indicates a number of PMI values to be reported: two parameters corresponding to two codebook configurations: a parameter indicating that multiple codebooks of PMI are to be reported: a parameter indicating that multiple values of a same report quantity are to be reported: or a combination thereof. In some embodiments, each transmission point is associated with: a distinct CMR group: or a distinct CMR unit of a CMR group of the first and second CMR groups. In various embodiments, the set of one or more transmission hypotheses corresponds to: at least one single-point transmission from one transmission point of the plurality of transmission points: at least one joint transmission from two or more transmission points of the plurality of transmission points: or a combination thereof.

In one embodiment: the CMR unit of a CMR group corresponds to a distinct NZP CSI-RS resource, and the first and second CMR groups are disjointed: the CMR unit of a CMR group corresponds to a distinct group of CSI-RS ports, and the first and second CMR groups are disjointed: the CMR unit of a CMR group corresponds to a distinct group of CSI-RS ports, and a first of the first and second CMR groups is a subset of a second of the first and second CMR groups: or some combination thereof. In certain embodiments, a set of beams configured in the CSI reporting setting is further decomposed into two subsets of beams. In some embodiments: sizes of the two subsets of beams are higher-layer configured, selected by the apparatus, or set by a rule; the two subsets of beams are not disjointed: two CBSR values are indicated for the two subsets of beams: an oversampling factor is indicated for at least one of the two subsets of beams: the beams are drawn from columns of an N-dimensional DFT basis matrix: or some combination thereof. In various embodiments, the value of N is 1, 2, or 3.

In one embodiment, the CSI report includes information corresponding to one or more codebooks, and wherein: a codebook is defined for each transmission point: one codebook is defined for all transmission points: a frequency oversampling factor is defined for a subset of the transmission points: the codebook is selected from a DFT basis, a SVD basis, or a free-selection basis: or some combination thereof. In certain embodiments, a size of the subset of the transmission points is one less than a selected number of transmission points. In some embodiments, the selection is higher-layer configured, apparatus assisted, or set by a rule.

In various embodiments, two transmission points are triggered for transmission, and wherein: the two transmission points are associated with two codebook types: the two transmission points are associated with two codeword transmissions: the two transmission points are associated with two sets of layers: the two transmission points are associated with two sets of beams: CSI corresponding to a selected one of the two transmission points is fed back by the apparatus: or some combination thereof. In one embodiment, the selection of one of two transmission points is higher-layer configured, apparatus assisted, or a combination thereof.

Figure 11:
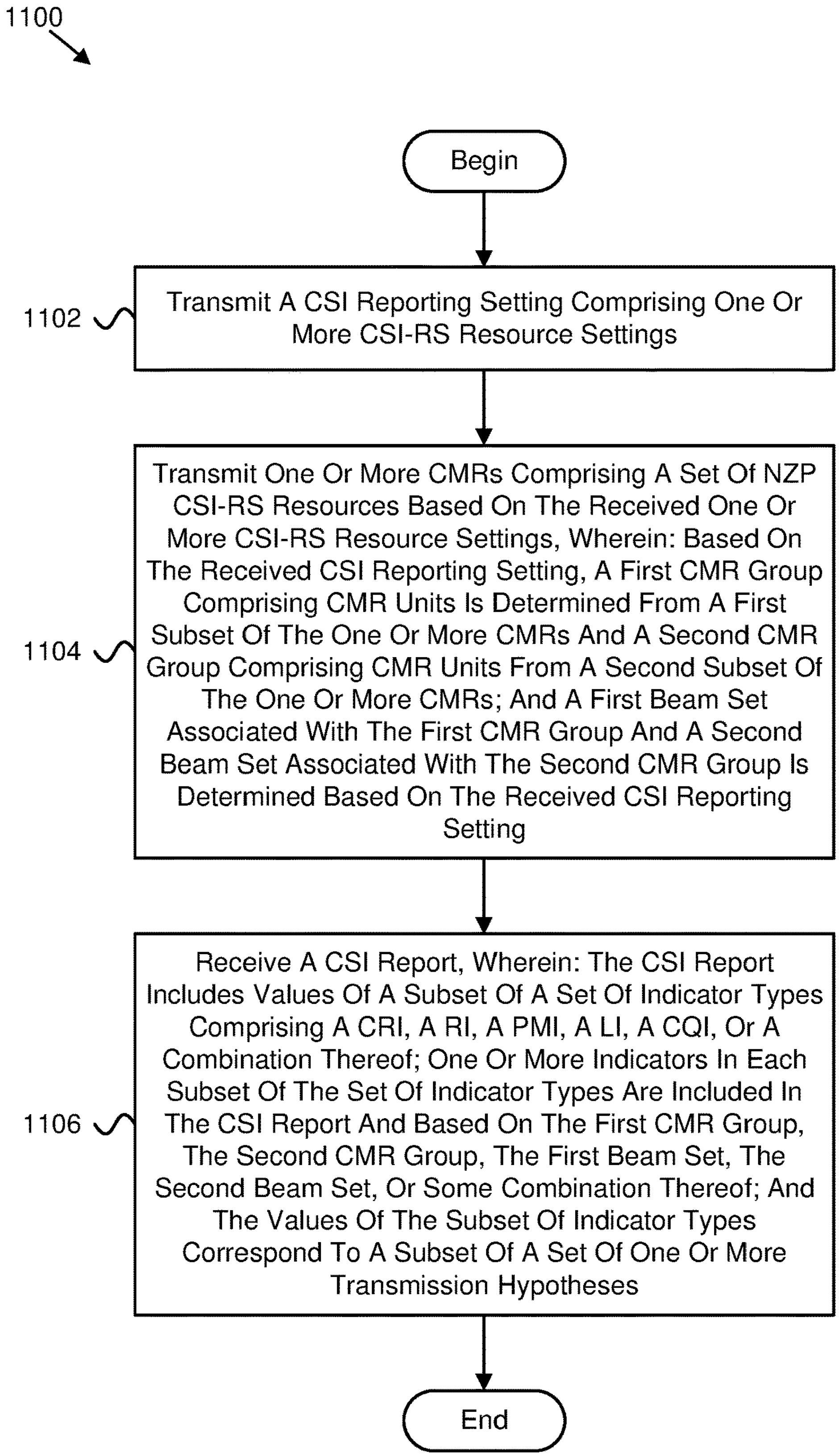
FIG. 11 is a flow chart diagram illustrating another embodiment of a method for transmitting a channel state information report.

FIG. 11 is a flow chart diagram illustrating another embodiment of a method 1100 for transmitting a channel state information report. In some embodiments, the method 1100 is performed by an apparatus, such as the network unit 104. In certain embodiments, the method 1100 may be performed by a processor executing program code, for example, a microcontroller, a microprocessor, a CPU, a GPU, an auxiliary processing unit, a FPGA, or the like.

In various embodiments, the method 1100 includes transmitting 1102, from a plurality of transmission points, a CSI reporting setting including one or more CSI-RS resource settings. In some embodiments, the method 1100 includes transmitting 1104 one or more CMRs including a set of NZP CSI-RS resources based on the received one or more CSI-RS resource settings. Based on the received CSI reporting setting, a first CMR group including CMR units is determined from a first subset of the one or more CMRs and a second CMR group including CMR units from a second subset of the one or more CMRs; and a first beam set associated with the first CMR group and a second beam set associated with the second CMR group is determined based on the received CSI reporting setting. In certain embodiments, the method 1100 includes receiving 1106 a CSI report. The CSI report includes values of a subset of a set of indicator types including a CRI, a RI, a PMI, a LI, a CQI, or a combination thereof: one or more indicators in each subset of the set of indicator types are included in the CSI report and based on the first CMR group, the second CMR group, the first beam set, the second beam set, or some combination thereof; and the values of the subset of indicator types correspond to a subset of a set of one or more transmission hypotheses.

In one embodiment, an apparatus comprises: a receiver to: receive a CSI reporting setting comprising one or more CSI-RS resource settings; and receive, from a plurality of transmission points, one or more CMRs comprising a set of NZP CSI-RS resources based on the received one or more CSI-RS resource settings: a processor to: determine, based on the received CSI reporting setting, a first CMR group comprising CMR units from a first subset of the one or more CMRs and a second CMR group comprising CMR units from a second subset of the one or more CMRs; and determine a first beam set associated with the first CMR group and a second beam set associated with the second CMR group based on the received CSI reporting setting; and a transmitter to transmit a CSI report, wherein: the CSI report includes values of a subset of a set of indicator types comprising a CRI, a RI, a PMI, a LI, a CQI, or a combination thereof; one or more indicators in each subset of the set of indicator types are included in the CSI report and based on the first CMR group, the second CMR group, the first beam set, the second beam set, or some combination thereof; and the values of the subset of indicator types correspond to a subset of a set of one or more transmission hypotheses.

In certain embodiments, the CSI reporting setting includes one or more higher-layer parameters that associate the CSI reporting setting with at least one transmission hypothesis corresponding to joint transmission from multiple transmission points, including: a parameter that enables transmission from a plurality of transmission points: a parameter that indicates a number of PMI values to be reported: two parameters corresponding to two codebook configurations: a parameter indicating that multiple codebooks of PMI are to be reported: a parameter indicating that multiple values of a same report quantity are to be reported: or a combination thereof.

In some embodiments, each transmission point is associated with: a distinct CMR group: or a distinct CMR unit of a CMR group of the first and second CMR groups.

In various embodiments, the set of one or more transmission hypotheses corresponds to: at least one single-point transmission from one transmission point of the plurality of transmission points: at least one joint transmission from two or more transmission points of the plurality of transmission points: or a combination thereof.

In one embodiment: the CMR unit of a CMR group corresponds to a distinct NZP CSI-RS resource, and the first and second CMR groups are disjointed: the CMR unit of a CMR group corresponds to a distinct group of CSI-RS ports, and the first and second CMR groups are disjointed: the CMR unit of a CMR group corresponds to a distinct group of CSI-RS ports, and a first of the first and second CMR groups is a subset of a second of the first and second CMR groups: or some combination thereof.

In certain embodiments, a set of beams configured in the CSI reporting setting is further decomposed into two subsets of beams.

In some embodiments: sizes of the two subsets of beams are higher-layer configured, selected by the apparatus, or set by a rule: the two subsets of beams are not disjointed: two CBSR values are indicated for the two subsets of beams; an oversampling factor is indicated for at least one of the two subsets of beams: the beams are drawn from columns of an N-dimensional DFT basis matrix: or some combination thereof.

In various embodiments, the value of N is 1, 2, or 3.

In one embodiment, the CSI report includes information corresponding to one or more codebooks, and wherein: a codebook is defined for each transmission point: one codebook is defined for all transmission points: a frequency oversampling factor is defined for a subset of the transmission points: the codebook is selected from a DFT basis, a SVD basis, or a free-selection basis: or some combination thereof.

In certain embodiments, a size of the subset of the transmission points is one less than a selected number of transmission points.

In some embodiments, the selection is higher-layer configured, apparatus assisted, or set by a rule.

In various embodiments, two transmission points are triggered for transmission, and wherein: the two transmission points are associated with two codebook types: the two transmission points are associated with two codeword transmissions: the two transmission points are associated with two sets of layers: the two transmission points are associated with two sets of beams: CSI corresponding to a selected one of the two transmission points is fed back by the apparatus: or some combination thereof.

In one embodiment, the selection of one of two transmission points is higher-layer configured, apparatus assisted, or a combination thereof.

In one embodiment, a method at a UE comprises: receiving a CSI reporting setting comprising one or more CSI-RS resource settings: receiving, from a plurality of transmission points, one or more CMRs comprising a set of NZP CSI-RS resources based on the received one or more CSI-RS resource settings: determining, based on the received CSI reporting setting, a first CMR group comprising CMR units from a first subset of the one or more CMRs and a second CMR group comprising CMR units from a second subset of the one or more CMRs: determining a first beam set associated with the first CMR group and a second beam set associated with the second CMR group based on the received CSI reporting setting; and transmitting a CSI report, wherein: the CSI report includes values of a subset of a set of indicator types comprising a CRI, a RI, a PMI, a LI, a CQI, or a combination thereof: one or more indicators in each subset of the set of indicator types are included in the CSI report and based on the first CMR group, the second CMR group, the first beam set, the second beam set, or some combination thereof; and the values of the subset of indicator types correspond to a subset of a set of one or more transmission hypotheses.

In one embodiment, a plurality of transmission points comprises: a transmitter to: transmit a CSI reporting setting comprising one or more CSI-RS resource settings; and transmit one or more CMRs comprising a set of NZP CSI-RS resources based on the received one or more CSI-RS resource settings, wherein: based on the received CSI reporting setting, a first CMR group comprising CMR units is determined from a first subset of the one or more CMRs and a second CMR group comprising CMR units from a second subset of the one or more CMRs; and a first beam set associated with the first CMR group and a second beam set associated with the second CMR group is determined based on the received CSI reporting setting; and a receiver to receive a CSI report, wherein: the CSI report includes values of a subset of a set of indicator types comprising a CRI, a RI, a PMI, a LI, a CQI, or a combination thereof; one or more indicators in each subset of the set of indicator types are included in the CSI report and based on the first CMR group, the second CMR group, the first beam set, the second beam set, or some combination thereof; and the values of the subset of indicator types correspond to a subset of a set of one or more transmission hypotheses.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A user equipment (UE), comprising:
- at least one memory; and
- at least one processor coupled with the at least one memory and configured to cause the UE to:
  - receive a channel state information (CSI) reporting setting comprising a CSI reference signal (CSI-RS) resource setting;
  - receive, from a plurality of transmission points, one or more CSI-RSs corresponding to one or more channel measurement resources (CMRs) comprising a set of non-zero power (NZP) CSI-RS resources based on the received CSI-RS resource setting;
  - determine, based on the received CSI reporting setting, a first CMR group of the one or more CMRs and a second CMR group of the one or more CMRs;
  - determine a first beam set associated with the first CMR group and a second beam set associated with the second CMR group based on the received CSI reporting setting; and transmit a CSI report, wherein:

the CSI report includes values of a subset of a set of indicator types comprising a rank indicator (RI), a precoder matrix indicator (PMI), a channel quality indicator (CQI), or a combination thereof; and one or more indicators in each subset of the set of indicator types are included in the CSI report and based on the first CMR group, the second CMR group, the first beam set, the second beam set, or a combination thereof.

2. The UE of claim 1, wherein each transmission point is associated with:

a distinct CMR group, and each CRM group corresponds to an NZP CSI-RS resource.

3. The UE of claim 1, wherein a set of beams configured in the CSI reporting setting is further decomposed into two subsets of beams.

4. The UE of claim 3, wherein:

sizes of the two subsets of beams are higher-layer configured, selected by the apparatus, or set by a rule;

the two subsets of beams are not disjointed;

two codebook subset restriction (CBSR) values are indicated for the two subsets of beams;

an oversampling factor is indicated for at least one of the two subsets of beams;

the beams are drawn from columns of an N-dimensional discrete Fourier transform (DFT) basis matrix;

or a combination thereof.

5. The UE of claim 1, wherein the CSI report includes a frequency oversampling factor is defined for a subset of the transmission points.

6. The UE of claim 5, wherein a size of the subset of the transmission points is one less than a selected number of transmission points.

7. The UE of claim 5, wherein the selection is higher-layer configured, apparatus assisted.

8. The UE of claim 1, wherein two transmission points are triggered for transmission, and wherein:

the two transmission points are associated with two sets of beams;

the two transmission points are associated with two oversampling indices of the beams;

or a combination thereof.

9. The UE of claim 8, wherein the selection of one of two transmission points is higher-layer configured, apparatus assisted, or a combination thereof.

10. The UE of claim 8, wherein a number of beams in the two sets of beams is reported by the UE.

11. The UE of claim 8, wherein values of numbers of beams in the two sets of beams are higher-layer configured.

12. The UE of claim 8, wherein a selection of the beams in each of the two sets of beams is reported by the UE.

13. The UE of claim 8, wherein a selection of the beams in each of the two sets of beams in the two sets of beams is selected by the UE.

14. A method performed by a user equipment (UE), the method comprising:

receiving a channel state information (CSI) reporting setting comprising a CSI reference signal (CSI-RS) resource setting;

receiving, from a plurality of transmission points, one or more CSI-RSs corresponding to one or more channel measurement resources (CMRs) comprising a set of non-zero power (NZP) CSI-RS resources based on the received CSI-RS resource setting;

determining, based on the received CSI reporting setting, a first CMR group of the one or more CMRs and a second CMR group of the one or more CMRs;

determining a first beam set associated with the first CMR group and a second beam set associated with the second CMR group based on the received CSI reporting setting; and transmitting a CSI report, wherein:

the CSI report includes values of a subset of a set of indicator types comprising a rank indicator (RI), a precoder matrix indicator (PMI), a channel quality indicator (CQI), or a combination thereof; and one or more indicators in each subset of the set of indicator types are included in the CSI report and based on the first CMR group, the second CMR group, the first beam set, the second beam set, or a combination thereof.

15. An apparatus for performing a network function of a User Equipment ("UE"), the apparatus comprising:

at least one memory; and at least one processor coupled with the at least one memory and configured to cause the apparatus to:

transmit a channel state information (CSI) reporting setting comprising a CSI reference signal (CSI-RS) resource setting; and transmit one or more CSI-RSs corresponding to one or more channel measurement resources (CMRs) comprising a set of non-zero power (NZP) CSI-RS resources based on the received CSI-RS resource setting, wherein:

based on the received CSI reporting setting, a first CMR group is determined from the one or more CMRs and a second CMR group is determined from the one or more CMRs; and a first beam set associated with the first CMR group and a second beam set associated with the second CMR group is determined based on the received CSI reporting setting; and receive a CSI report, wherein:

the CSI report includes values of a subset of a set of indicator types comprising a rank indicator (RI), a precoder matrix indicator (PMI), a channel quality indicator (CQI), or a combination thereof; and one or more indicators in each subset of the set of indicator types are included in the CSI report and based on the first CMR group, the second CMR group, the first beam set, the second beam set, or a combination thereof.

16. A processor of a User Equipment ("UE") for wireless communication, comprising:

at least one controller coupled with at least one memory and configured to cause the processor to:

receive a channel state information (CSI) reporting setting comprising a CSI reference signal (CSI-RS) resource settings;

receive, from a plurality of transmission points, one or more CSI-RSs corresponding to one or more channel measurement resources (CMRs) comprising a set of non-zero power (NZP) CSI-RS resources based on the received CSI-RS resource setting;

determine, based on the received CSI reporting setting, a first CMR group of the one or more CMRs and a second CMR group of the one or more CMRs;

determine a first beam set associated with the first CMR group and a second beam set associated with the second CMR group based on the received CSI reporting setting; and transmit a CSI report, wherein:

the CSI report includes values of a subset of a set of indicator types comprising a rank indicator (RI), a precoder matrix indicator (PMI), a channel quality indicator (CQI), or a combination thereof; and one or more indicators in each subset of the set of indicator types are included in the CSI report and based on the first CMR group, the second CMR group, the first beam set, the second beam set, or a combination thereof.

17. The processor of claim 16, wherein each transmission point is associated with:

a distinct CMR group, and each CRM group corresponds to an NZP CSI-RS resource.

18. The processor of claim 16, wherein a set of beams configured in the CSI reporting setting is further decomposed into two subsets of beams.

19. The processor of claim 18, wherein:

sizes of the two subsets of beams are higher-layer configured, selected by the apparatus, or set by a rule;

the two subsets of beams are not disjointed;

two codebook subset restriction (CBSR) values are indicated for the two subsets of beams;

an oversampling factor is indicated for at least one of the two subsets of beams;

the beams are drawn from columns of an N-dimensional discrete Fourier transform (DFT) basis matrix;

or a combination thereof.

20. The processor of claim 16, wherein the CSI report includes:

a frequency oversampling factor is defined for a subset of the transmission points.

* * * * *